United States Patent
Yasuda et al.

[11] Patent Number: 5,999,694
[45] Date of Patent: Dec. 7, 1999

[54] VIDEO INFORMATION REPRODUCTION STOPPING AND RESUMING APPARATUS

[75] Inventors: Sigeru Yasuda; Munetoshi Moriichi, both of Tokorozawa, Japan

[73] Assignee: Pioneer Electronic Corporation, Tokyo-to, Japan

[21] Appl. No.: 08/745,484

[22] Filed: Nov. 12, 1996

[30] Foreign Application Priority Data

Nov. 10, 1995 [JP] Japan .................................. 7-293187

[51] Int. Cl.[6] .................................................. H04N 5/91
[52] U.S. Cl. .............................. 386/70; 386/68; 386/111; 386/125
[58] Field of Search .................................. 386/4, 6–8, 46, 386/33, 52, 70, 61–62, 65, 111–112, 125, 109, 68–69; 360/13, 32; 369/83; H04N 5/91

[56] References Cited

U.S. PATENT DOCUMENTS

| | | | |
|---|---|---|---|
| 5,463,601 | 10/1995 | Yanagisawa | 364/32 |
| 5,510,899 | 4/1996 | Kim | 386/111 |
| 5,535,008 | 7/1996 | Yamagishi et al. | 358/342 |
| 5,596,564 | 1/1997 | Fukushima et al. | 369/275.3 |
| 5,642,338 | 6/1997 | Fukushima et al. | 369/59 |
| 5,710,859 | 1/1998 | Takeuchi et al. | 386/111 |
| 5,727,113 | 3/1998 | Shimoda | 386/68 |
| 5,732,185 | 3/1998 | Hirayama et al. | 386/70 |
| 5,740,304 | 4/1998 | Katsuyama et al. | 386/46 |
| 5,740,310 | 4/1998 | De Haan et al. | 386/95 |
| 5,748,332 | 5/1998 | Lee | 358/335 |

Primary Examiner—Wendy Garber
Assistant Examiner—Vincent F. Boccio
Attorney, Agent, or Firm—Nixon & Vanderhye P.C.

[57] ABSTRACT

Apparatus for stopping the reproduction of the video information from a record medium (e.g., the video CD recorded by the MPEG1 method) is provided. A group index detector detects a group index identifying the picture group including the picture being displayed when an external reproduction stop signal is inputted. A group index memory stores this detected group index. A record position detector detects the record position (e.g., a stop sector address) of the picture being processed when the external reproduction stop signal is inputted as well as output record position information representing the detected record position. A record position memory stores this detected record position information.

41 Claims, 18 Drawing Sheets

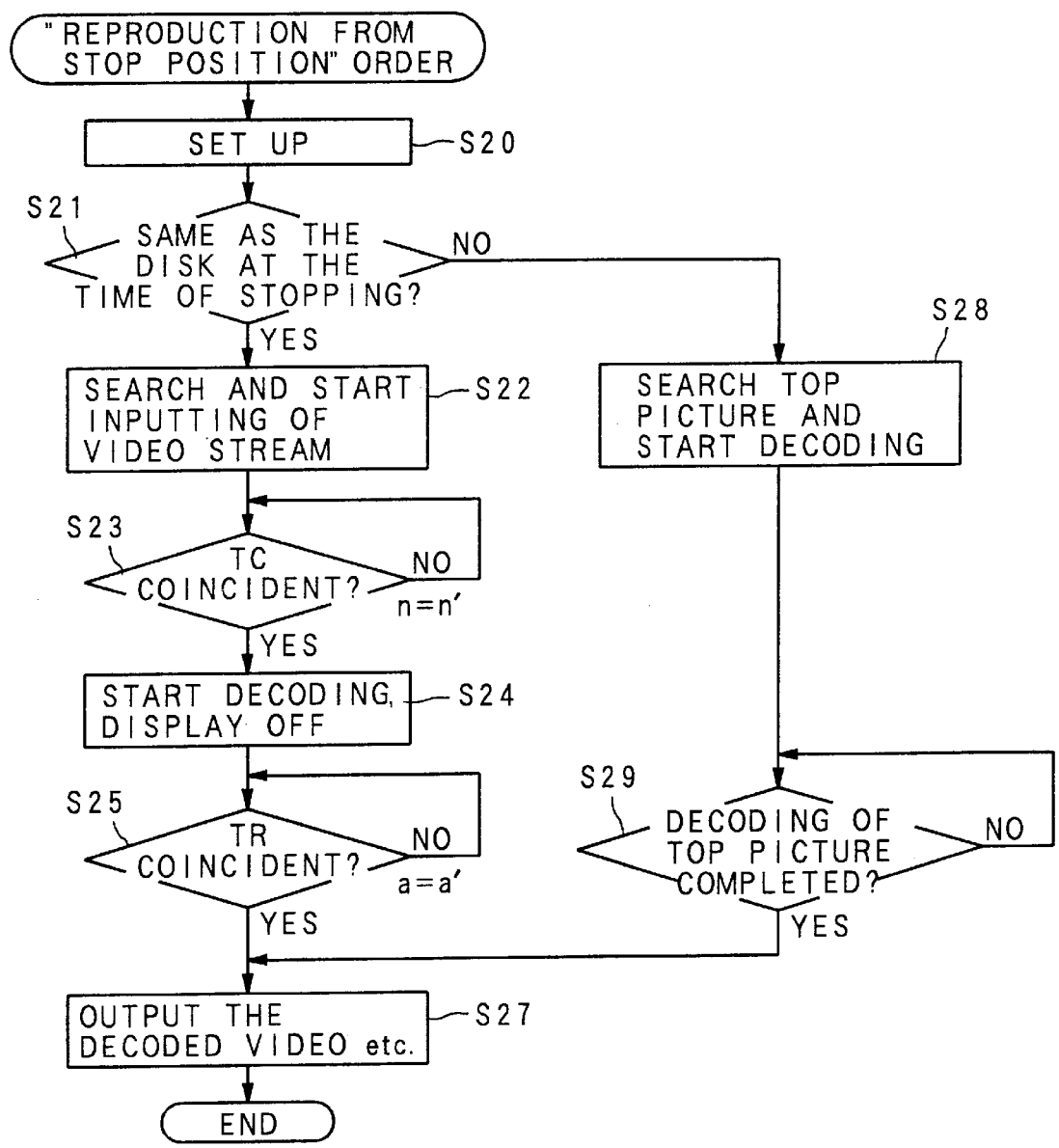

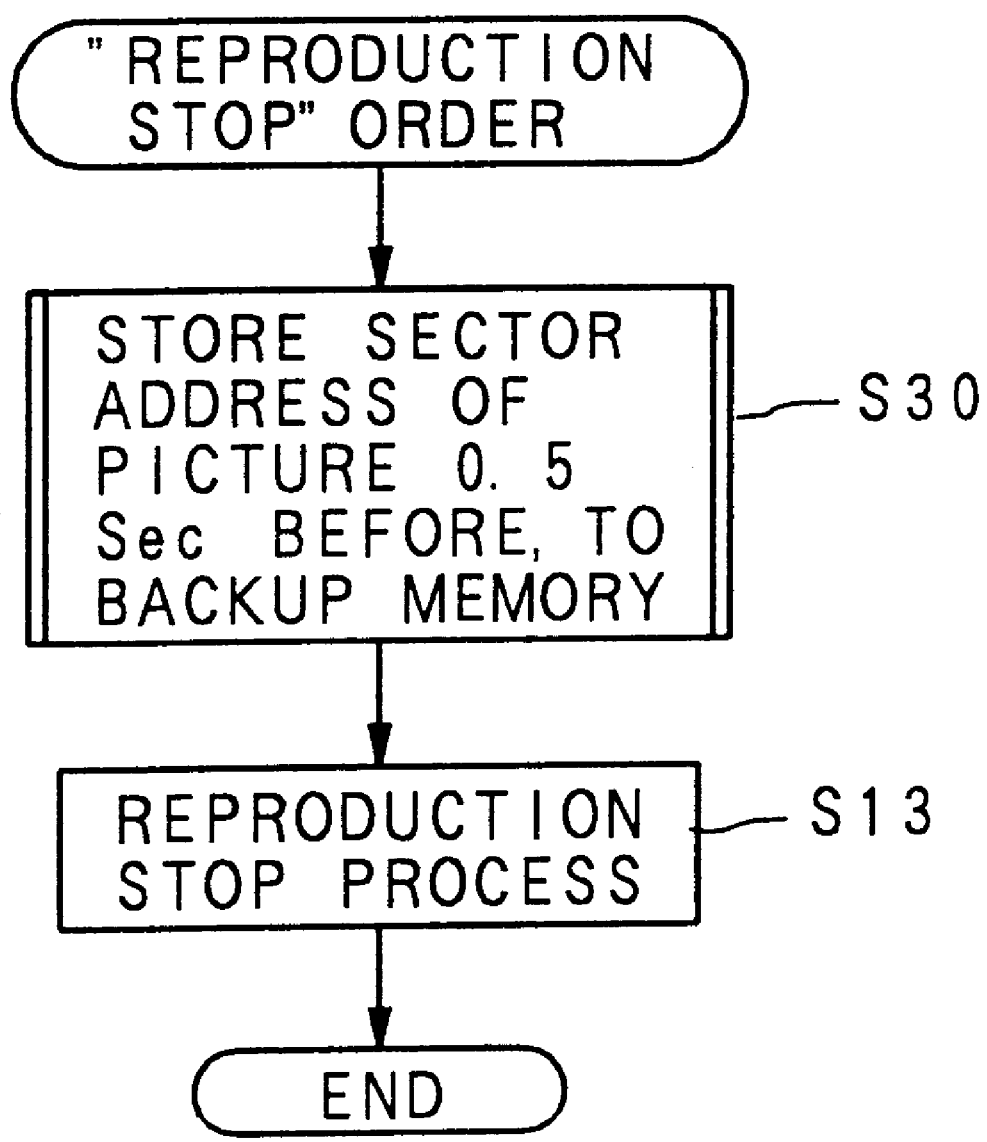

FIG. 7

SCAN DATA FILE

SC

| BYTE POSITION | SIZE (BYTE) | FIELD NAME |
|---|---|---|
| 1-8 | 8 | FILE INDENTIFIER |
| 9-10 | 2 | VIDEO CD VERSION No. |
| 11-12 | 2 | TOTAL NUMBER OF SECTOR ADDRESS OF I PICTURE |
| 13-14 | 3 | SECTOR ADDRESS $n_1$ OF I PICTURE (1) |
| ⋮ | ⋮ | ⋮ |
|  |  | SECTOR ADDRESS $n_N$ OF I PICTURE (N) |

FIG.15

LOT

| SECTOR ADDRESS | EXPLANATION | VALUE | SIZE |
|---|---|---|---|
| 00:04:02 | RESERVED | $0000 | 2BYTE |
| | List ID 1 OFFSET UNIT ADDRESS | $0000 | 2BYTE |
| | List ID 2 OFFSET UNIT ADDRESS | $XXXX | 2BYTE |
| | ⋮ | ⋮ | ⋮ |
| | List ID m OFFSET UNIT ADDRESS | $FFFF (REJECT) | 2BYTE |
| | ⋮ | ⋮ | ⋮ |
| | List ID n OFFSET UNIT ADDRESS | $xxxx | 2BYTE |
| | UNUSED List ID | $FFFF | 2BYTE |
| | ⋮ | ⋮ | ⋮ |
| 00:04:33 | UNUSED List ID | $FFFF | 2BYTE |

42

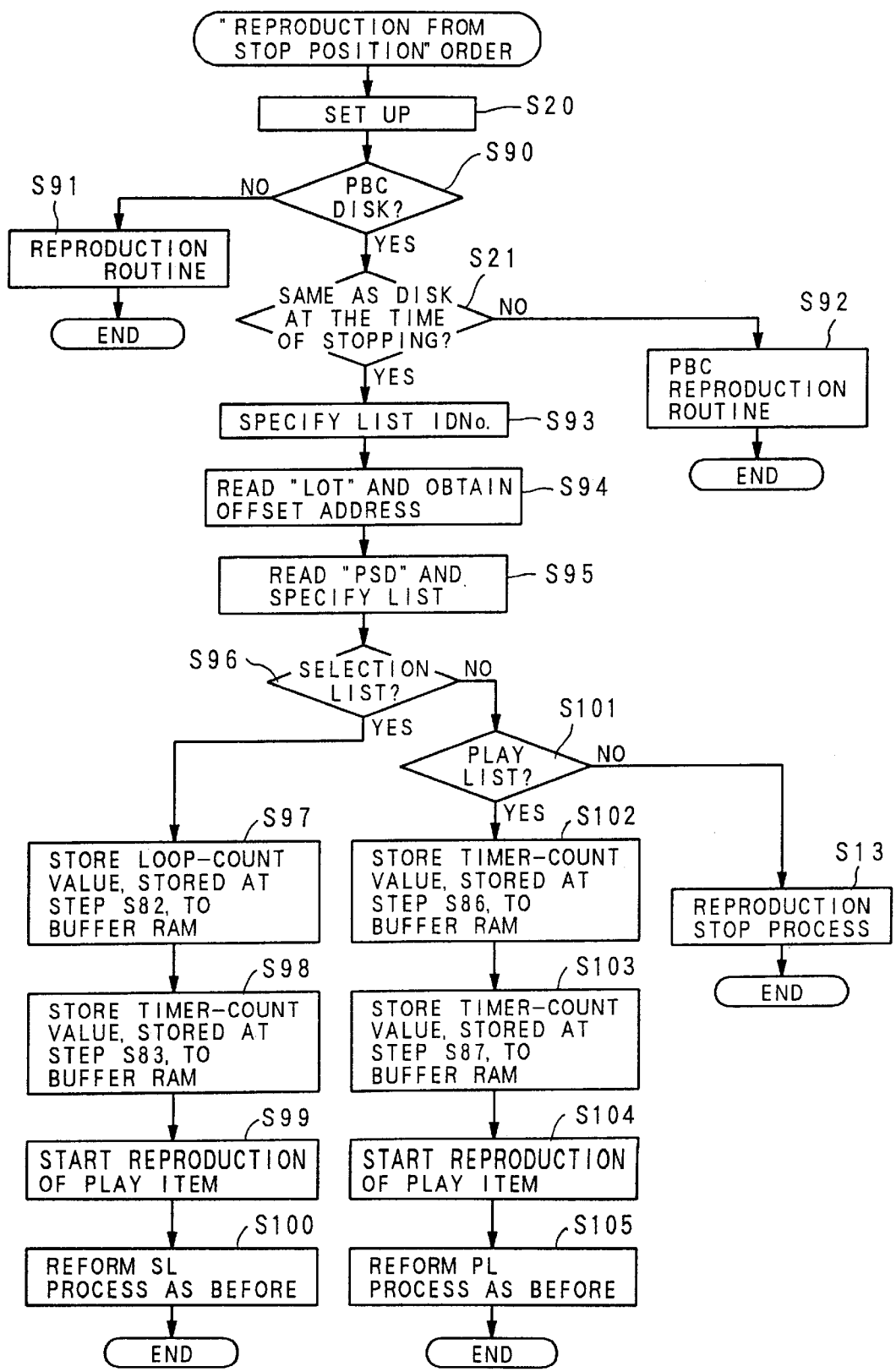

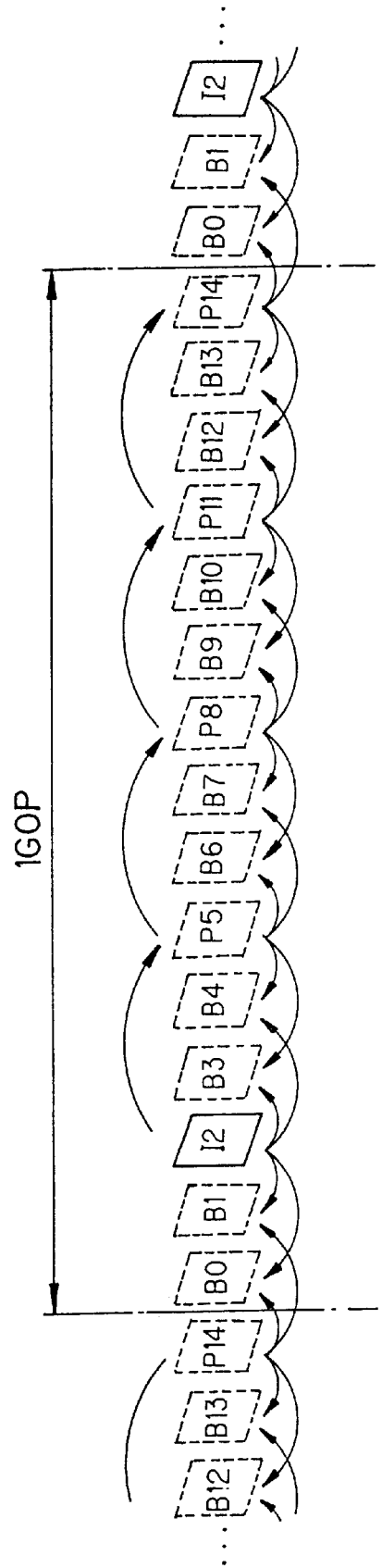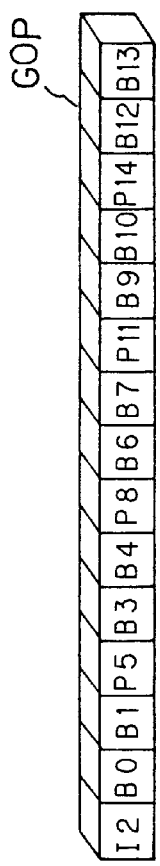

VIDEO INFORMATION REPRODUCTION STOPPING AND RESUMING APPARATUS

BACKGROUND OF THE INVENTION

1. Field of the Invention

The present invention is related to stopping and resuming reproduction of video information from an optical disk having a compact disk size on which compressed video information and corresponding audio information are recorded (so-called a video CD (Compact Disk)). The video information and audio information, in case of transiently stopping reproduction and resuming later, automatically resumes reproduction from the stopped position.

2. Description of Related Art A known LD (Laser Disk) has a diameter of 30 cm provides an optical disk on which video information is recorded.

Video information with extended length, such as a movie or the like, is often recorded on this LD. Thus, it may be desired that while reproducing the movie or the like, reproduction be transiently stopped in the middle, and after that, to resume reproduction from the stopped position.

An LD player for reproducing this LD comprises a last memory function for storing, when transiently stopping the reproduced video information, an absolute address, which represents a record position on the optical disk from the beginning of the whole video information recorded on the LD, of the picture at the stopped point. Upon resuming reproduction, by using this stored absolute address, reproduction is resumed from the absolute address.

Recently, there is also a known so-called video CD on which video and audio information known (similar to that on the LD) is recorded on an optical disk having a CD size smaller than the above-mentioned LD.

In this video CD, since video information and audio information with 74 minutes nearly similar to the LD are recorded on an optical disk having CD size, the video information and audio information are recorded in respectively compressed states. The MPEG1 (Moving Picture Experts Group 1) method, which is a national standard for a method of compressing and accumulating video information, is employed.

Now, compression of video information using the MPEG1 method is schematically explained with reference to FIGS. 18A and 18B.

In generally continuous frames, frame pictures located before and after one frame picture are similar to each other and have a mutual relation between each other, in many cases. The MPEG1 method notes this point and generates, on the basis of a plurality of frame pictures, another frame picture existing between the plurality of frame pictures, by means of an interpolation operation based on a movement vector between the respective frame pictures and the like. In this case, when recording the next frame picture in a sequence, only information with respect to a difference and the movement vector between the above mentioned plurality of frame pictures are recorded. Accordingly, when reproducing, it is possible to refer to this vector and estimated difference data from the above mentioned plurality of frame pictures to thereby reproduce the another frame picture. As a result, it is possible to carry out compression of the video information.

The MPEG1 method uses a unit of GOP (Group Of Picture), as a minimum data unit from which a picture can be singly reproduced, without referring to other frame pictures. FIG. 18A shows an example of a plurality of frame pictures constituting one GOP. In FIG. 18A, one GOP is composed of 15 frame pictures. Among those frame pictures, a frame picture shown by a symbol [I] is referred to as an I picture (Intra-coded picture). This means a frame picture in which one frame picture can be perfectly re-constituted by its own information. And, a frame picture shown by a symbol [P] is referred to as a P picture (Predictive-coded picture). This is an estimation picture generated by decoding the difference from other pictures reproduced on the basis of an already decoded I picture or P picture. Further, a frame picture shown by a symbol [B] is referred to as a B picture (Bidirectionally predictive-coded picture). This is an estimation picture reproduced by using not only an already decoded I picture or P picture but also a future I picture or future P picture recorded on the optical disk. After an I picture and a P picture are decoded, a B picture is reproduced and inserted between them. In FIG. 18A, the estimation relation (interpolation relation) between the respective pictures (frame pictures) are indicated by using arrows.

The order of the respective pictures in FIG. 18A shows the original sequence of source pictures before being recorded on the optical disk. As shown in FIG. 18B, they are recorded on the optical disk with the I picture within and at the beginning of a GOP. This is arranged by considering the estimation relation between the respective pictures when decoding.

Further, when recorded on the optical disk, a GOP header is disposed at the beginning of each GOP. This GOP header is defined so as to record GSC (Group Start Code) representing the beginning of the GOP, and TC (Time Code) which is time information representing elapsed time from the beginning of the reproduction of the whole video GOP information.

Furthermore, when recorded, for each above mentioned picture, a (Picture Start Code) is recorded representing the beginning of a picture layer and a TR (Temporal Reference) is recorded representing the display sequence (a numerical indicia in FIG. 18A) from a first picture within the GOP in which each picture exists.

The above mentioned MPEG1 method is widely generalized as a first international standard for picture compression. By using this method, it is possible to record a dynamic picture with 74 minutes of video on one optical disk.

On the other hand, a function called PBC (Play Back Control) function has recently been developed for a video CD, and a player comprising the PBC function is sold on the market. This PBC function is implemented by data called PST (Play Sequence Descriptor) recorded on the video CD with other video information and audio information. This function reproduces the video information and audio information recorded on the video CD, in a sequence designated by a designer (author) who designs the video information and audio information irrespective of the recorded sequence. For this reason, a menu screen by which a user selects a picture to be reproduced, and a static picture and a dynamic picture of effectively playing the recorded video information and audio information are recorded on the video CD corresponding to the PBC function, with the above mentioned video information and audio information and PST.

By this PBC function, the video CD has various user access performances. The user can carry out a numeric operation of specifying a desirable picture by a numeral key to thereby reproduce the specified pictures picture. A default selection operation of pushing a selection key while viewing a displayed menu screen to select and reproduce the desirable picture is also possible. A multiple default selection operation in which a picture of jump destination (a picture reproduced by skipping a plurality of pictures from a presently viewed picture) is different at when the selection key is pressed, and the like may also be provided.

However, because video information is compressed in the video CD on which the video information is recorded by the MPEG1 method, it is impossible to record the absolute address at the stopped point (as in the conventional LD) to thereby resume reproduction from a picture corresponding to the absolute address. This results in a problem because stop and of video reproduction are impossible.

That is, in a video CD on which video information is recorded by the MPEG1 method, even if the above mentioned TC (Time Code) or TR (Temporal Reference) is stored as an absolute address at the stopped point, in a case where TC and TR correspond to the P picture or the B picture shown in FIGS. 18A and 18B, the reproduction picture can not be reproduced only by this P picture or B picture. That is, as mentioned above, the P picture or the B picture data cannot by itself reproduce a complete picture frame corresponding to the P picture or B picture unless using I picture or P picture reproduced before that point. Accordingly, reproduction stopping and resumption using an absolute address as a conventional LD can not be used for a video CD.

SUMMARY OF THE INVENTION

It is therefore a first object of the present invention to transiently stop reproduction of a record medium on which video information is compressed and recorded, such as a video CD recorded by the MPEG1 method, and also to automatically resume its reproduction without losing the continuity of the reproduced picture.

It is a second object of the present invention to transiently stop reproduction of a record medium on which video information is compressed and recorded and which has the PBC (Play Back Control) function, such as a video CD recorded by the MPEG1 method with the PBC function, and to automatically resume its reproduction without losing continuity of the reproduced picture.

The above first object of the present invention can be achieved when the recorded video information includes a plurality of picture groups (e.g. GOP (Group Of Picture)), each of which has a group index (e.g. TC (Time Code)) for identifying each of the picture groups and has a plurality of pictures (e.g. I (Intra-coded), P (Predictive-coded) and B (Bidirectionary predictive-coded) pictures), each of which is compressed by intra-frame-coding or predictive-coding. A group index detector detects the group index which identifies one picture group including one picture being displayed when a reproduction stop signal occurs. A group index memory stores this detected group index. A record position detector detects the record position (e.g. a stop sector address) of this picture at the stop position and outputs record position information representing the detected record position. A record position memory stores this record position information. When a reproduction stop signal occurs, a group index (e.g. TC) may identify a picture group (e.g. GOP) including one picture (e.g. I, P or B picture), which is displayed at the stop signal time is detected by a group index detector. Then, it is stored into a group index memory. On the other hand, a record position (e.g. a stop sector address) of the picture at the stop position may be detected and record position information outputted. Then, it is stored into a record position memory. Accordingly, when resuming reproduction, continuity of the reproduced picture can be maintained by resuming the reproduction on the basis of the group index (e.g. TC) stored in the group index memory and the record position information (e.g. a stop sector address) stored in the record position memory.

In one aspect, said one group index may comprise a time code (i.e. TC) which represents the elapsed time at said one picture group from a beginning of video information on the record medium.

According to this aspect, continuity of the reproduced picture can be certainly maintained by resuming reproduction on the basis of the time code and the record position information.

In another aspect, each of the pictures is provided with a picture index (e.g. TR (Temporal Reference)) for identifying each of the pictures, and the apparatus is farther provided with: a picture index detector for detecting a picture index which identifies said one picture, which is displayed at stop time. A picture index memory for storing said one picture index.

According to this aspect, when the reproduction stop signal occurs, the picture index is also detected and stored into the picture index memory. Accordingly, at the time of resuming reproduction, it can be resumed from the picture itself, which has been stopped, on the basis of the picture index (e.g. TR), while continuity of the reproduced pictures can be maintained on the basis of the group index (e.g. TC) and the record position information (e.g. a stop sector address).

In this aspect, said one picture index may comprise a temporal reference (i.e. TR) which represents the display order of said one picture from a beginning picture within said one picture group. In this case, reproduction can be certainly resumed from the picture itself, which has been stopped, on the basis of the picture index.

In the above described apparatus, each of the group index memory and the record position memory may comprise a non-volatile memory. In this case, the group index and the record position memory can be kept even if the main power is turned off, and it is possible to resume reproduction where continuity of the reproduced pictures is maintained even after the main power is turned on. In the same sense, the above described picture index memory may also comprise a non-volatile memory.

The above second object of the present invention can be achieved by a second apparatus for stopping reproduction of video information from a record medium on which the video information and selection reproduction information (e.g. SL (Selection List), PL (Play List)) are recorded, the video information comprising a plurality of picture groups (e.g. GOP), each of which has a group index (e.g. TC) for identifying each of the picture groups and has a plurality of pictures (e.g. I, P and B pictures), each of which is compressed by intra-frame-coding or predictive-coding, the selection reproduction information comprising a plurality of lists and a list identifier for identifying each of the lists, the lists respectively prescribing reproduction orders of partial video informations of the video information so as to select one partial video information to be reproduced. The second stopping apparatus is provided with: a list identifier detection device for detecting, from the selection reproduction information, one list identifier which identifies one list corresponding to one picture, which is displayed at a timing when an external reproduction stop signal occurs and a list identifier memory for storing said one list identifier detected by the list identifier detection device.

According to the second stopping apparatus of the present invention, when an external reproduction stop signal occurs, a list identifier which identifies one list (e.g. SL, PL) corresponding to the picture being displayed is detected from the selection reproduction information by a list identifier detector. Then, it is stored into a list identifier memory. Accordingly, at the time of resuming reproduction, continuity of the reproduced picture can be maintained by resuming reproduction on the basis of the list (e.g. SL, PL) corresponding to the list identifier stored in the list identifier memory.

In one aspect of the second stopping apparatus, the selection reproduction information may further comprise a plurality of partial video information numbers for respectively indicating the partial video information to be selectively reproduced, and the apparatus is further provided with: a partial video information number detector for detecting one partial video information number which indicates one partial video information including the picture being processed at stop time; a partial video information number memory for storing said one partial video information number detected by the partial video information number detection device; a group index detection device for detecting one group index (e.g. TC) which identifies one picture group (e.g. GOP) including said one picture (e.g. I, P or B picture), which is displayed stop time; a group index memory for storing said one group index detected by the group index detection device; a record position detection device for detecting a record position (e.g. a stop sector address) of said one picture on the record medium when the reproduction stop signal is inputted, and outputting record position information representing the detected record position; and a record position memory for storing the record position information outputted from the record position detection device.

According to this aspect, when the reproduction stop signal is inputted, one partial video information number which indicates one partial video information including the picture at stop time is detected by a partial video information number detection device. Then, it is stored into a partial video information number memory. One group index (e.g. TC) which identifies one picture group (e.g. GOP) including said one picture (e.g. I, P or B picture), which is displayed at the timing when the reproduction stop signal is inputted, is detected by a group index detection device. Then, it is stored into a group index memory. On the other hand, a record position (e.g. a stop sector address) of said one picture on the record medium at the timing when the reproduction stop signal is inputted, is detected, and record position information is outputted by a record position detection device. Then, it is stored into a record position memory. Accordingly, at the time of resuming reproduction, continuity of the reproduced picture can be certainly maintained by resuming the reproduction on the basis of the partial video information number, the group index, the record position information stored in the respective memories, in addition to the list corresponding to the list identifier.

In this aspect, each of the pictures may be provided with a picture index (e.g. TR) for identifying each of the pictures, and the apparatus may be further provided with: a picture index detection device for detecting one picture index which identifies said one picture, which is displayed at the timing when the reproduction stop signal is inputted; and a picture index memory for storing said one picture index detected by the picture index detection device. In this case, when the reproduction stop signal is inputted, one picture index which identifies said one picture, which is displayed at the time when the reproduction stop signal is inputted, is detected by a picture index detection device. Then, it is stored into a picture index memory. Accordingly, at the time of resuming reproduction, it can be resumed from the stopped picture itself, on the basis of the picture index (e.g. TR), while the continuity of reproduced pictures can be maintained.

The above first object of the present invention can be also achieved by a first stopping and resuming apparatus for stopping and resuming a reproduction of video information from a record medium on which the video information is recorded, the video information comprising a plurality of picture groups (e.g. GOP), each of which has a group index (e.g. TC) for identifying each of the picture groups and has a plurality of pictures (e.g. I, P and B pictures), each of which is compressed by intra-frame-coding or predictive-coding. The first stopping and resuming apparatus is provided with the aforementioned first stopping apparatus, and is further provided with: a reading device for reading the video information from one record position corresponding to a predetermined time before in a recording order from the record position represented by the record position information stored in the record position memory, when a reproduction resumption signal to resume the reproduction of the video information is inputted from the external; a group detection device for detecting one picture group having one group index coincident with the group index stored in the group index memory on the basis of the video information read by the reading device; and a reproduction resuming device for resuming the reproduction on the basis of the intra-frame-coded picture (e.g. I picture) within the detected picture group among the video information read by the reading device.

According to the first stopping and resuming apparatus, when a reproduction resumption signal to resume the reproduction of the video information is inputted from the external, the video information from one record position corresponding to a predetermined time before in a recording order from the record position represented by the record position information stored in the record position memory, is read by a reading device. Then, one picture group having one group index coincident with the group index stored in the group index memory is detected by a group detection device, on the basis of the video information read by the reading device. Finally, reproduction is resumed by a reproduction resuming device, on the basis of the intra-frame-coded picture within the detected picture group among the video information read by the reading device. Thus, continuity of the reproduced picture can be maintained by resuming reproduction from the intra-frame coded picture (e.g. I picture), which can be reproduced by itself (i.e., which does not require other pictures before or after it as in the case of the predictive-coded picture).

In one aspect of the first stopping and resuming apparatus, the apparatus may be further provided with a judging device for judging whether or not the record medium, which is set on the apparatus when the reproduction resumption signal is inputted, is the same as that set when the reproduction stop signal was inputted. Accordingly, if the record medium is not judged to be the same, an ordinary resuming operation can be speedily performed regardless of continuity. Only if the record medium is judged to be the same, can the above described resuming operation to maintain continuity be performed.

In another aspect of the first stopping and resuming apparatus, each of the pictures is provided with a picture index (e.g. TR) for identifying each of the pictures, and the apparatus is further provided with: a picture index detection device for detecting one picture index which identifies said one picture, which is displayed at the timing when the reproduction stop signal is inputted; a picture index memory for storing said one picture index detected by the picture index detection device; and a picture detection device for detecting one picture having one picture index coincident with the picture index stored in the picture index memory within the detected picture group, the reproduction resuming device resuming reproduction from the detected picture on the basis of the intra-frame-coded picture within the detected picture group and the detected picture.

According to this aspect, when the reproduction stop signal is inputted, one picture index which identifies the stopped picture, is detected by a picture index detection device. Then, it is stored into a picture index memory. When the reproduction resumption signal is inputted, a picture having a picture index coincident with the picture index stored in the picture index memory within the detected picture group, is detected by a picture detection device. Finally, reproduction is resumed from the detected picture on the basis of the intra-frame-coded picture within the detected picture group and detected picture. Accordingly, at the time of resuming it, the reproduction can be resumed from the picture itself, which has been stopped, on the basis of the picture index (e.g. TR), while maintaining continuity of the reproduced pictures.

In this aspect, the apparatus may be further provided with the aforementioned judging device. Thus, if the record medium is not judged to be the same, an ordinary resuming operation can be speedily performed regardless of continuity.

The second object of the present invention can be also achieved by a video information reproduction stopping and resuming apparatus for stopping and resuming a reproduction of video information from a record medium on which the video information and selection reproduction information (e.g. SL, PL) are recorded, the video information comprising a plurality of picture groups (e.g. GOP), each of which has a group index (e.g. TC) for identifying each of the picture groups and has a plurality of pictures (I, P and B pictures ), each of which is compressed by intra-frame-coding or predictive-coding, the selection reproduction information comprising a plurality of lists and a list identifier for identifying each of the lists, the lists respectively prescribing reproduction orders of partial video informations of the video information so as to select one partial video information to be reproduced. The second stopping and resuming is provided with the aforementioned second stopping apparatus, and is further provided with: a list detection device for detecting said one list corresponding to said one picture, which was displayed when the reproduction stop signal was inputted, on the basis of the list identifier stored in the list identifier memory, when an external reproduction resumption signal is inputted and a reproduction resuming device for resuming reproduction of partial video information in the reproduction order prescribed by the detected list.

According to the second stopping and resuming apparatus, when the reproduction resumption signal is inputted, said one list corresponding to said one picture, which was displayed when the reproduction stop signal was inputted, is detected by a list detection device, on the basis of the list identifier stored in the list identifier memory. Finally, reproduction of partial video information is resumed in the reproduction order prescribed by the detected list. Accordingly, continuity of the reproduced picture can be maintained in accordance with the appropriate list in the selection reproduction information.

In one aspect of the second stopping and resuming apparatus, it may be further provided with the aforementioned judging device. Thus, if the record medium is not judged to be the same, an ordinary resuming operation can be speedily performed regardless of continuity.

In another aspect of the second stopping and resuming apparatus, the selection reproduction information further comprises a plurality of partial video information numbers for respectively indicating the partial video informations to be selectively reproduced. The second stopping and resuming apparatus is also provided with: the partial video information number detection device; the partial video information number memory; the group index detection device; the group index memory; the record position detection device; and the record position memory in the aforementioned one aspect of the second stopping apparatus of the present invention. The second stopping and resuming apparatus is further provided with: a specifying device for specifying the partial video information, which was displayed at the timing when the reproduction stop signal was inputted, on the basis of the detected list and the partial video information number stored in the partial video information number memory; a reading device for reading the specified partial video information from one record position corresponding to a predetermined time before in a recording order from the record position represented by the record position information stored in the record position memory; and a group detection device for detecting one picture group having one group index coincident with the group index stored in the group index memory on the basis of the partial video information read by the reading device, the reproduction resuming device resuming the reproduction on the basis of the intra-frame-coded picture within the detected picture group among the partial video information read by the reading device.

According to this aspect, when the reproduction resumption signal is inputted, the partial video information, which was displayed at the timing when the reproduction stop signal was inputted, is specified by a specifying device, on the basis of the detected list and the partial video information number stored in the partial video information number memory. Then, the specified partial video information is read by a reading device from one record position corresponding to a predetermined time before in a recording order from the record position represented by the record position information stored in the record position memory. Then, one picture group having one group index coincident with the group index stored in the group index memory is detected by a group detection device, on the basis of the partial video information read by the reading device. Finally, reproduction is resumed by a reproduction resuming device, on the basis of the intra-frame-coded picture within the detected picture group among the partial video information read by the reading device. Accordingly, continuity of the reproduced picture can be maintained by resuming reproduction from the intra-frame-coded picture (e.g. I picture), which can be reproduced by itself and is included in the read partial video information and in the detected picture group.

In this aspect, each of the pictures may be provided with a picture index (e.g. TR) for identifying each of the pictures and the apparatus may be also provided with the picture index detection device and the picture index memory in the aforementioned second stopping apparatus of the present invention. The second stopping and resuming apparatus may be further provided with a picture detection device for detecting one picture having one picture index coincident with the picture index stored in the picture index memory within the detected picture group, the reproduction resuming device resuming reproduction from the detected picture on the basis of the intra-frame-coded picture within the detected picture group and the detected picture. Accordingly, when the reproduction resumption signal is inputted, one picture having one picture index coincident with the picture index stored in the picture index memory within the detected picture group, is detected by a picture detection device, and reproduction is resumed by the reproduction resuming device, from the detected picture on the basis of the intra frame-coded picture within the detected picture group and the detected picture. Thus, reproduction can be resumed from the picture itself, which has been stopped, on the basis of the picture index (e.g. TR), while maintaining the continuity of the reproduced pictures.

The above first object of the present invention can be also achieved by a third stopping and resuming apparatus for stopping and resuming a reproduction of video information from a record medium on which the video information and scan information are recorded, the video information comprising a plurality of picture groups (e.g. GOP), each of which has a group index (e.g. TC) for identifying each of the picture groups and has a plurality of pictures (e.g. I, P and B pictures), each of which is compressed by intra-frame-coding or predictive-coding, the scan information representing record positions of all intra-frame-coded pictures on the record medium. The third stopping and resuming apparatus is provided with: a record position detection device for detecting a record position (e.g. a stop sector address) of one picture, which is displayed at a timing when an external reproduction stop signal to stop reproduction of the video information is inputted and outputting record position information representing the detected record position; a record position memory for storing the record position information outputted from the record position detection device; a searching device for searching one record position of one intra-frame-coded picture, which is prior and closest to the record position represented by the record position information stored in the record position memory among said all intra-frame-coded pictures with referring to the scan information, when a reproduction resumption signal to resume the reproduction of the video information is inputted from the external; and a reproduction resuming device for resuming the reproduction of the video information from said one record position searched by the searching device.

According to the third stopping ands reproducing apparatus, when the reproduction stop signal is inputted, the record position (e.g. a stop sector address) of one picture, which is displayed at the timing when the reproduction stop signal is inputted, is detected and the record position information is outputted by the record position detection device. Then, it is stored into the record position memory. Then the reproduction resuming signal is inputted, one record position of one intra-frame-coded picture, which is prior and closest to the record position represented by the record position information stored in the record position memory, is searched by the searching device, among said all intra-frame-coded pictures with referring to the scan information. Finally, the reproduction of video information is resumed by the reproduction resuming device from said one record position searched by the searching device. Accordingly, continuity of the reproduced picture can be maintained by resuming the reproduction from the intra-frame-coded picture (e.g. I picture), which is searched at the time of resuming and which can be reproduced by itself.

The above first object of the present invention can be achieved by a fourth stopping and resuming apparatus for stopping and resuming a reproduction of video information from a record medium on which the video information is recorded, the video information comprising a plurality of picture groups (e.g. GOP), each of which has a group index (e.g. TC) for identifying each of the picture groups and has a plurality of pictures (e.g. I, P and B pictures), each of which is compressed by intra-frame-coding or predictive-coding. The fourth stopping and resuming apparatus is provided with: a record position detection device for detecting a record position (e.g. stop sector address) of a top picture in one picture group including one picture, which is displayed at a timing when an external reproduction stop signal to stop the reproduction of the video information is inputted and outputting record position information representing the detected record position; a record position memory for storing the record position information outputted from the record position detection device; a searching device for searching one record position of one intra-frame-coded picture, which is prior and closest to the record position represented by the record position information stored in the record position memory among the intra-frame-coded pictures in said one picture group, when a reproduction resumption signal to resume the reproduction of the video information is inputted; and a reproduction resuming device for resuming reproduction of the video information from said one record position searched by the searching device.

According to the fourth stopping and resuming apparatus, when reproduction stopping signal is inputted, the record position (e.g. stop sector address) of a top picture in one picture group including one picture, which is displayed at a timing when the reproduction stop signal is inputted from the external, is detected and the record position information is outputted by the record position detection device. Then, it is stored into the record position memory. Then the reproduction resuming signal is inputted, one record position of one intra-frame-coded picture, which is prior and closest to the record position represented by the record position information stored in the record position memory is searched by the searching device, among the intra-frame-coded pictures in said one picture group. Finally, the reproduction of the video information is resumed by the reproduction resuming device, from said one record position searched by the searching device. Accordingly, the continuity of the reproduced picture can be maintained by resuming the reproduction from the intra-frame-coded picture (e.g. I picture), which record position is searched at the time of resuming and which can be reproduced by itself.

The above first object of the present invention can be also achieved by a fifth stopping and resuming apparatus for stopping and resuming a reproduction of video information from a record medium on which the video information and scan information are recorded, the video information comprising a plurality of picture groups (e.g. GOP), each of which has a group index (e.g. TC) for identifying each of the picture groups and has a plurality of pictures (e.g. I, P and B pictures), each of which is compressed by intra-frame-coding or predictive-coding, the scan information representing record positions of all intra-frame-coded pictures on the record medium. The fifth stopping and resuming apparatus is provided with: a record position detection device for detecting a record position (e.g. a stop sector address) of one picture, which is displayed at a timing when a reproduction stop signal to stop the reproduction of the video information is inputted from the external; a searching device for searching one record position of one intra-frame-coded picture, which is prior and closest to the record position detected by the record position detection device among said all intra-frame-coded pictures with referring to the scan information, and outputting record position information representing the searched record position; a record position memory for storing the record position information outputted from the searching device; and a reproduction resuming device for resuming the reproduction of the video information from the record position represented by the record position information stored in the record position memory, when a reproduction resumption signal to resume the reproduction of the video information is inputted.

According to the fifth stopping and resuming apparatus, when the reproduction stop signal is inputted, the record position (e.g. a stop sector address) of one picture, which is displayed at a timing when the reproduction stop signal is inputted, is detected by the record position detection device. Then, one record position of one intra-frame-coded picture, which is prior and closest to the record position detected by the record position detection device is searched by the searching device, among said all intra-frame-coded pictures with referring to the scan information, and the record position information representing the searched record position is outputted. Then, it is stored into the record position memory. Then the reproduction resuming signal is inputted, the reproduction of the video information is resumed by the reproduction resuming device from the record position represented by the record position information stored in the record position memory. Accordingly, the continuity of the reproduced picture can be maintained by resuming the reproduction from the intra-frame-coded picture (e.g. I picture), which record position is searched at the time of stopping and which can be reproduced by itself.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 4 is a flow chart showing an operation when resuming the reproduction in the first embodiment;

FIG. 6 is a flow chart showing a process when a reproduction is stopped in a second embodiment;

FIG. 7 is a diagram showing a content of a scan data file;

FIG. 15 is a diagram showing a content of an LOT.

FIG. 17 is a flow chart showing an operation when resuming the reproduction in the fifth embodiment; and FIGS. 18A and 18B are diagrams showing frame pictures constituting GOP.

DETAILED DESCRIPTION OF PREFERRED EMBODIMENTS

Preferred embodiments of the present invention are explained with reference to the drawings.

(I) Apparatus Configuration

At first, a configuration of a video CD reproducing apparatus comprising a video information reproduction stopping apparatus and a video information reproduction resuming apparatus in accordance with the present invention is explained with reference to FIG. 1.

Figure 1:
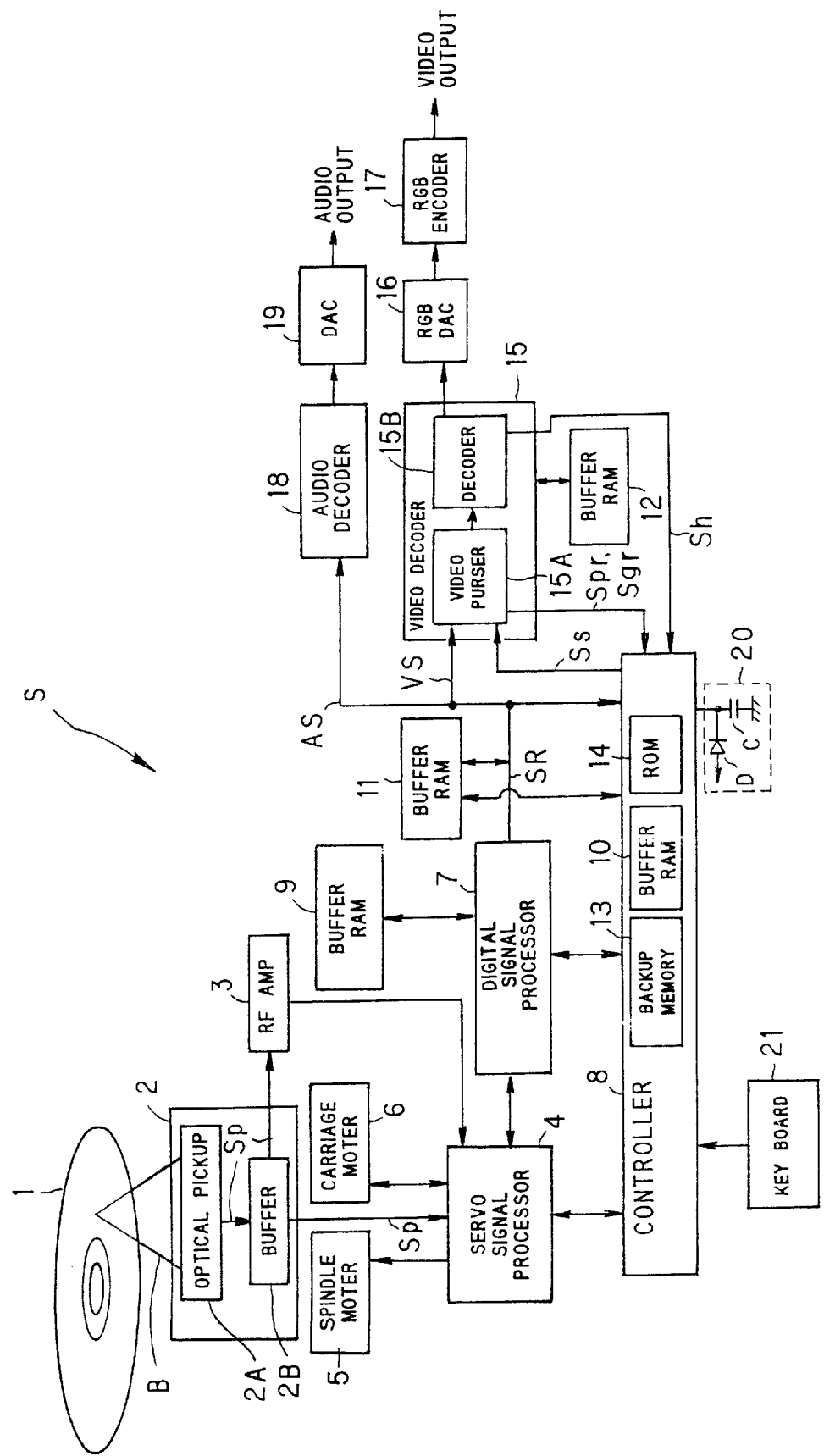
FIG. 1 is a block diagram showing a schematic configuration of a video CD reproducing apparatus.

As shown in FIG. 1, a video CD reproducing apparatus S of the present invention comprises a pickup unit 2 as a reading device and a list identifier detection device, an optical pickup 2A, a buffer 2B, an RF (Radio Frequency) amplifier 3, a servo signal processor 4, a spindle motor 5, a carriage motor 6, a digital signal processor 7, a controller 8 as a group index detection device, a record position detection device, a picture index detection device, a judging device, a reproduction resuming device, a group detection device, a picture detection device and a specifying device respectively, buffer RAMs (Random Access Memories) 9, 10, 11 and 12, a backup memory 13 as a group index memory, a record position information memory, a picture index memory, a list identifier memory and a partial video information number memory respectively, an ROM (Read Only Memory) 14, a video decoder 15, a video purser iSA, a decoder 15B, an RGB (Red Green Blue) DAC (D/A Converter) 16, an ROB encoder 17, an audio decoder 18, a DAC 19, a backup power supply 20 and a keyboard 21.

The construction and operation of the apparatus S are schematically explained as for each element.

The optical pickup 2A constituting the pickup unit 2 comprises a laser diode, an objective lens, a focus actuator, a tracking actuator, a light detector and the like which are not shown, irradiates a light beam B, such as a laser light and the like, as a reproduction light to a video CD 1 on which video information and audio information to be reproduced are recorded, and outputs to the buffer 2B a detection signal Sp corresponding to the video information and audio information recorded on the basis of the reflected light. The buffer 2B transiently stores the outputted detection signal Sp, and outputs it to the RF amplifier 3 and the servo signal processor 4 at a predetermined timing.

At this time, the servo signal processor 4 controls the spindle motor Sand the carriage motor 6, on the basis of the detection signal Sp from the RF amplifier 3 and the buffer 2B. The spindle motor 5 rotates the video CD 1 at a predetermined speed under the control of the servo signal processor 4. In parallel to these operations, the carriage motor 6 moves the pickup unit 2 in a radius direction of the video CD 1 under the control of the servo signal processor 4. The light beam B is irradiated along an information track on the video CD 1 by these operations of the spindle motor 5 and the carriage motor 6. Accordingly, the information is reproduced.

On the other hand, the detection signal Sp outputted to the servo signal processor 4 is outputted to the digital signal processor 7. Processes, such as a de-interleave, an error correction and the like, are carried out for the detection data Sp, and a stream SR including the frame video information and audio information is generated. This stream SR is outputted to the video decoder 15 (as a video stream VS) and the audio decoder 18 (as an audio stream AS), and also outputted to the controller 8. Further, the buffer RAM 9 transiently stores the data after the de-interleave, and also transiently stores the data before and after the error correction.

The buffer RAM 11 transiently stores each information, when distributing the video information and audio information included in the stream SR to the video stream VS including the video information and the audio stream AS including the audio information under the control of the controller 8.

The video stream VS separated from the stream SR by the buffer RAM 11 and the controller 8 is inputted to the video decoder 15, and the frame picture is decoded. At this time, the buffer RAM 12 transiently stores an I picture for decoding a B picture and a P picture, and also transiently stores the P picture and the I picture for decoding the B picture. Further, the video purser 15A included in the video decoder 15 identifies the GOP included in the inputted video stream VS to thereby detect GSC of each GOP, and outputs to the controller 8 a GOP layer interruption signal Sgr described later, each time each GSC is detected. In parallel to these operations, the video purser 15A detects PSC corresponding to each picture of the GOP, and outputs to the controller 8 a picture layer interruption signal Spr described later each time each PSC is detected.

On the other hand, the decoder 15B decodes the video stream VS passed through the video purser 15A, and decodes the frame picture corresponding to each picture. At this time, the decoder 15B outputs to the controller 8 a display interruption signal Sh described later, each time a vertical synchronizing signal corresponding to each picture is inputted.

Each frame picture decoded by the video decoder 15 is D/A-converted by the RGBDAC 16 for each primary color, further encoded by the RGB encoder 17 for each color, and outputted to and displayed on a display device and the like, which are not shown, as a video output.

On the other hand, the audio stream AS separated from the stream SR by the buffer RAM 11 and the controller 8 is inputted to the audio decoder 18. After decoded, it is D/A-converted by the DAC 19, and outputted to a speaker and the like, which are not shown, as an analog audio output.

And, the controller 8 controls the video CD reproducing apparatus S as a whole, on the basis of a program corresponding to a flow chart explained in respective embodiments described later, in addition to the above mentioned operations. At this time, the program is stored in advance in the ROM 14 and read out as necessary. Operations of the buffer RAM 10 and the backup memory 13 are described later in the respective embodiments. Incidentally, the backup memory 13 is composed of a non-volatile memory. Thus, even if the power supply of the video CD reproducing apparatus S is shut off, since the power supply is sent by the backup power supply 20, a content stored in the backup memory 13 is never lost due to the shutoff of the power supply.

Further, the controller 8 is adapted such that each time the GSC (Group Start Code) is inputted from the video purser 15A, the corresponding TC (Time Code) is read in. It is also adapted such that each time the PSC is inputted from the video purser 15A, the corresponding TR (Temporal Reference) is read in. Simultaneously, it is adapted so as to read in the TR of the presently displayed picture, each time the vertical synchronizing signal is detected by the decoder 15B. It is possible to turn on and off the indication on the display device and the like, while decoding the video stream VS.

Moreover, an operation, such as a reproduction stop order required to control the video CD reproducing apparatus S or the like, is carried out by the keyboard 21. Based on it, the controller 8 controls the video CD reproducing apparatus S as a whole.

The operations of the video CD reproducing apparatus S having the above mentioned configuration are explained hereinafter for the respective embodiments.

(II) First Embodiment

Next, a first embodiment is explained with reference to FIGS. 1 to 5.

(A) Operation During Reproducing

At first, an operation during reproducing in the first embodiment is explained with reference to FIGS. 1 and 2.

Figure 2A:
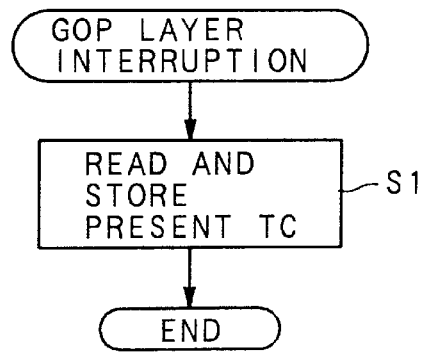
FIG. 2A is a flow chart showing a process when a GOP layer interruption signal is inputted, in the first embodiment.
Figure 2B:
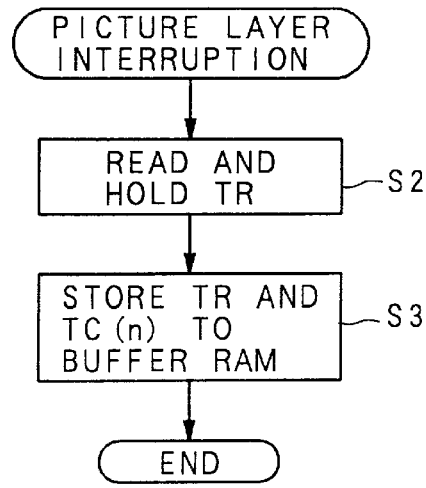
FIG. 2B is a flow chart showing a process when a picture layer interruption signal is inputted, in the first embodiment.
Figure 2C:
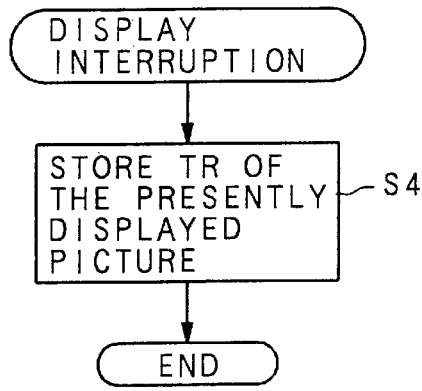
FIG. 2C is a flow chart showing a process when a display interruption signal is inputted, in the first embodiment.

Storing of the TC for each GOP shown in FIG. 2A, storing of the TR corresponding to the TC shown in FIG. 2B and storing of the TR for each display interruption signal Sh shown in FIG. 2C are carried out in parallel to each other, during reproducing in the first embodiment.

That is, in the storing process of the TC for each GOP shown in FIG. 2A, when the GSC is detected by the video purser 15A to which the stream VS is inputted, the GOP layer interruption signal Sgr is outputted to the controller 8. Accordingly, the TC at that point is transiently held in the buffer RAM 10 as a parameter "n" (Step S1).

In the storing process of the TR corresponding to the TC shown in FIG. 2B, when the PSC is detected by the video purser 15A, the picture layer interruption signal Spr is outputted to the controller 8. Accordingly, the TR at that point is transiently held (Step S2). The held TR with the TC at that point (parameter "n") are stored in the buffer RAM 10 (Step S3).

Figure 2D:
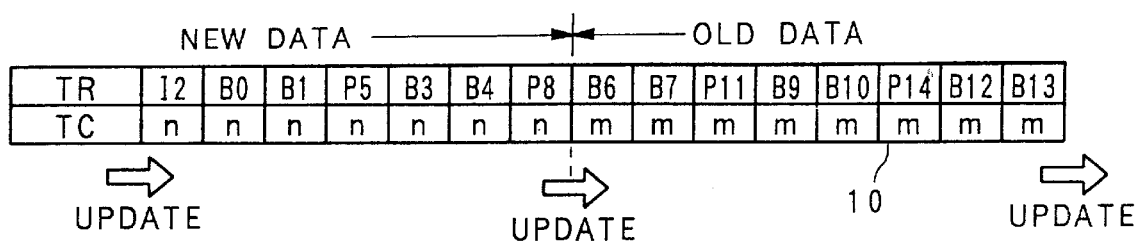
FIG. 2D is a diagram showing a memory state in a buffer RAM during reproducing, in the first embodiment.

As shown in FIG. 2D, the buffer RAM 10 is divided into 15 memory areas equal to the number of the pictures included in one GOP. Each time a new TR is detected in FIG. 2B, the TR with the TC at that point are updated and stored sequentially from a left side of the memory areas in FIG. 2D. In FIG. 2D, areas up to a seventh area are for TCs (shown by symbols "n" of FIG. 2D) and TRs of a new GOP. Areas starting with an eighth area are for TCs (shown by symbols "m" of FIG. 2D) and TRs of the one previous GOP.

Further, in the storing process of the TR for each display interruption signal Sh shown in FIG. 2C, when the display interruption signal Sh corresponding to each picture is inputted from the decoder 15B to the controller 8, the TR corresponding to the display interruption (namely, corresponding to the presently displayed picture) is stored in other memory area of the buffer RAM (Step S4).

During reproducing in the first embodiment, the TC and TR are repeatedly updated and stored by repeating the above mentioned operations.

(B) Operation Then Reproduction Is Stopped

A reproduction stop operation in the first embodiment is explained with reference to FIGS. 1 and 3.

Figure 3A:
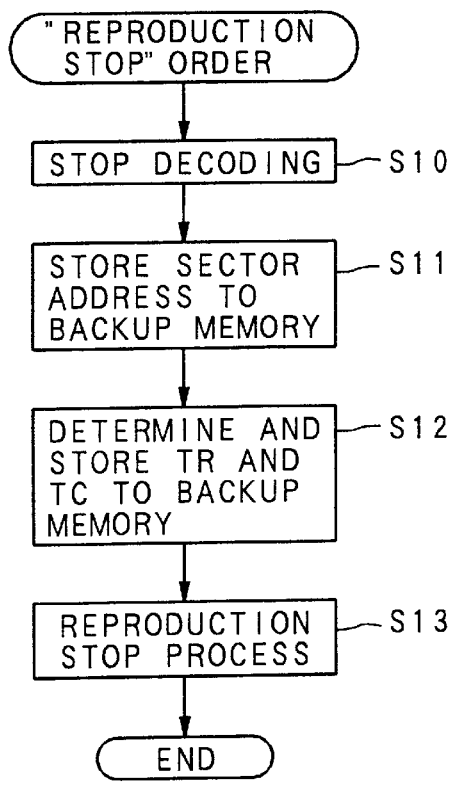
FIG. 3A is a flow chart showing the operation when the reproduction is stopped in the first embodiment.

As shown in FIG. 3A, at a time of stopping the reproduction, when a reproduction stop order is inputted by the keyboard 21, the controller 8 outputs a reproduction stop signal Ss to the video decoder 15 (Step S10). The video decoder 15 outputs to the controller 8 a sector address (time information representing a record position on the video CD) as a stop picture address representing a memory position on the video CD 1 of a picture (which is not yet displayed) read out from the video CD 1 at a timing when the reproduction stop signal Ss in inputted, and this stop picture address is stored in the backup memory 13 (Step S11). After that, the video decoder 15 outputs to the controller 8 the display interruption signal Sh corresponding to the decoded picture at a timing when the reproduction stop signal Ss is inputted. The controller 8 detects the TR at that point from the inputted video stream VS, refers to a content (refer to FIG. 2D) stored in the buffer RAM 10 from the TR to thereby read out the corresponding TC, and stores the TC with the detected TR into the backup memory 13 (Step S12).

Figure 3B:
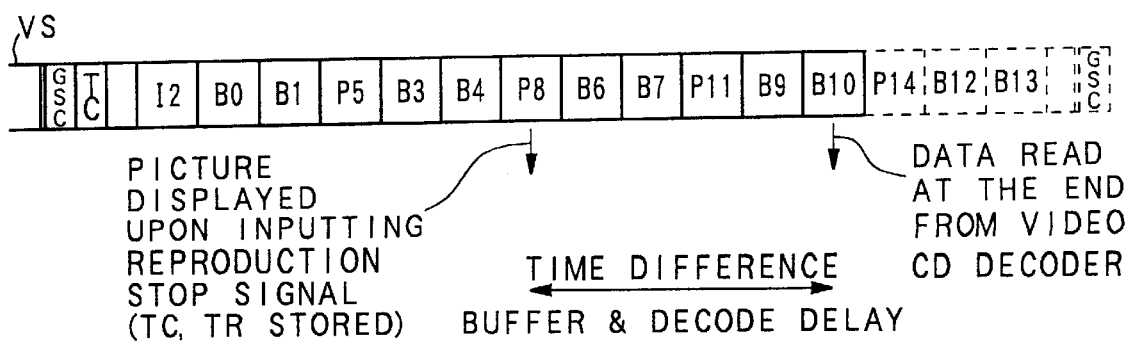
FIG. 3B is a diagram showing a picture stored when the reproduction is stopped, in the first embodiment.

The processes in the steps S11 and S12 are more actually explained. Now, assuming that the video stream VS shown in FIG. 3B is detected from the video CD and that the reproduction stop signal Ss is inputted when a B picture B10 is detected, the controller 8 stores the sector address on the video CD 1, at which the B picture B10 is recorded, as the stop picture address, into the backup memory 13. In parallel to this, assuming that a picture, which is actually decoded and displayed as the picture when the reproduction stop signal Ss is inputted, is a P picture P8, a TR (=8) of the P picture P8 is detected by the display interruption signal Sh at this point. The corresponding TC is read out by referring to the content of the buffer RAM 10 according to the detected TR, and they are stored into the backup memory 13. The TC and TR corresponding to the picture displayed actually when the reproduction stop signal Ss is inputted are stored by these operations.

Incidentally, the reason why time error is generated between the picture (the B picture B10 in FIG. 3B) detected by the video CD 1 and the actually displayed picture (the P picture P8 in FIG. 3B) when the reproduction stop signal Ss is inputted is that delay is induced by the memory time of each buffer RAM in decoding the video information and the decoding process itself. This delayed time is approximately 0.5 seconds in a case of the video CD reproducing apparatus S shown in FIG. 1.

When the TC and TR corresponding to the picture displayed actually when the reproduction stop signal Ss is inputted are stored (Step S12), reproduction stop processes, such as fixing of the optical pickup 2A, stopping of rotation of the video CD 1 and the like are carried out (Step S13). Then, the process is ended.

(C) Operation Then Reproduction Is Resumed

Figure 5A:
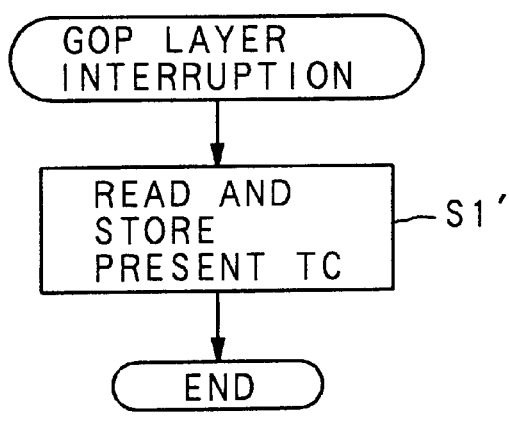
FIG. 5A is a flow chart showing a process when the GOP layer interruption signal is inputted, while a video stream is inputted in case of resuming the reproduction in the first embodiment.
Figure 5B:
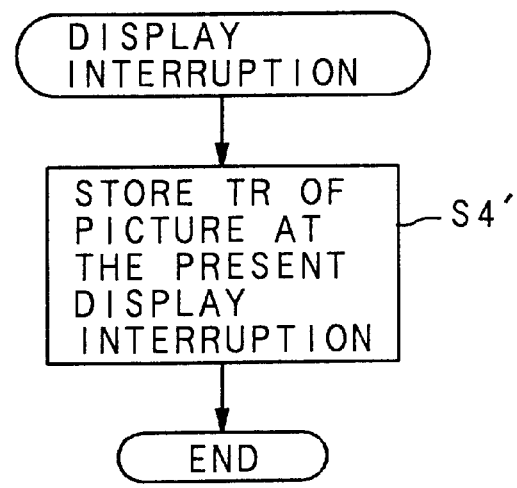
FIG. 5B is a flow chart showing a process when the display interruption signal is inputted, while a video stream is inputted in case of resuming the reproduction in the first embodiment.

An operation at a time of resuming the reproduction in the first embodiment is explained with reference to FIGS. 1, 4 and 5.

As shown in FIG. 4, at a time of resuming the reproduction, when a reproduction resumption order is inputted by the keyboard 21, setup processes, such as driving of the optical pickup 2A, rotating of the video CD and the like, are carried out (Step S20). Then the setup processes are ended (Step S20), it is judged whether or not a presently mounted video CD is the video CD on which the video information and audio information having the same content as the video CD 1 mounted at a time of stopping the reproduction are recorded (Step S21). This judgment is judged by the controller 8 at a time of reading out volume identifiers (all of them are the same value in the video CD on which the video information and audio information having the same content are recorded) among PVD (Primary Volume Descriptor), which is recorded in advance on the video CD and is detected in the setup processes (Step S20).

If judged as the video CD having the same content at the step S21 (Step S21; YES), it reads out the stop picture address (refer to the step S11 of FIG. 3A) stored in the backup memory 13, searches a sector address located approximately 2.5 seconds before in the recording sequence on the video CD 1 from the reproduction stop sector address, detects the video information and audio information recorded thereon, and starts to input the video stream VS (Step S22).

The reason why searching the sector address located approximately 2.5 seconds before, from the reproduction stop sector address, at the step S22 is that in a case of the video CD 1, a length of one GOP is in a range from approximately 0.5 seconds to approximately 2.0 seconds, and considering this time and the delayed time (approximately 0.5 seconds) in the buffer and the decoder explained in FIG. 3B, if searching the sector address located approximately 2.5 seconds before from the stop picture address, at least one I picture is recorded between the sector address and the stop picture address.

When inputting the video stream VS in the step S22, similarly to the case of stopping the reproduction (refer to the steps S1 and S4 in FIGS. 2A to 2C), the storing process (a step S1') of the TC for each GOP shown in FIG. SA and the storing process (a step S4') of the TR for each display interruption signal Sh shown in FIG. SB are carried out in parallel to each other.

When inputting of the video stream VS from the sector address located approximately 2.5 seconds before from the reproduction stop sector address is started (Step S22), it is judged whether or not a TC in the inputted video stream VS, which is coincident with the TC stored in the backup memory 13 at the stopped point (refer to the step S12 in FIG. 3A), is stored (refer to the step S1') (Step S23). If there is no coincident TC (Step S23; NO), inputting of the video stream VS is continued until the coincident TC is detected. If the coincident TC is detected (Step S23 ; YES), the GOP corresponding to the detected TC is determined as the GOP reproduced when the reproduction is stopped, and decoding of the picture is started (Step S24). At this time, the indication to the display is kept off, and thereby the picture display is not carried out.

When the decoding is started (Step S24), it is judged whether or not the TR of the decoded picture, which is coincident with the TR stored in the backup memory 13 at the stopped point (refer to the step S12 in FIG. 3A), is stored (refer to the step S4') (Step S25). If there is no coincident TR (Step S25; NO), the decoding is continued until the coincident TR is detected. If the coincident TR is detected (Step S25; YES), assuming that a picture having the detected TR corresponds to the picture displayed when the reproduction is stopped, the indication to the display is turned on, and the picture display is resumed (Step S27).

On the other hand, at the step S21, if judged that a video CD different from the video CD 1 when the reproduction is stopped is mounted (Step S21; NO), a top picture is searched in order to reproduce a normal video CD, the decoding is started (Step S28), and the operation is waited (Step S29; NO) until the decoding is completed. If completed (Step S29; YES), the reproduction after that point is continued (Step S27).

As mentioned above, according to the reproduction stop process and the reproduction resumption process of the first embodiment, it is possible to resume the reproduction from the picture itself displayed when the reproduction is stopped, by storing the TC and TR of the display picture when the reproduction is stopped and by searching the TC and TR which are respectively coincident with the above mentioned TC and TR at a time of resuming the reproduction.

(D) Variation Embodiment Of First Embodiment

The first embodiment is constituted so as to store the TC and TR of the display picture when the reproduction is stopped and to search the TC and TR which respectively coincide with the above mentioned TC and TR when resuming the reproduction. However, it is not limited to this configuration. That is, it may be constituted so as to store only the stop picture address and the TC when the reproduction is stopped and to start to input the video stream VS from a sector address located approximately 2.5 seconds before from the stop picture address and to resume the reproduction from the beginning of the GOP having the TC coincident with the TC when the reproduction is stopped.

In this case, although the reproduction cannot be resumed from the picture itself displayed when the reproduction is stopped, the reproduction from the same GOP is possible. Thus, the reproduction can be resumed in a range in which the picture continuity is not damaged from a time when the reproduction is stopped.

If starting to input the video stream VS from a sector address located approximately 4.5 seconds before from the stored reproduction stop address, it is also possible to resume from a picture corresponding to the two previous GOP.

Further, if starting to input the video stream VS from a sector address located before a predetermined time equal to or more than approximately 4.5 seconds, it is also possible to reproduce from a picture corresponding to the GOP several GOPs earlier. In this case, it is also possible to remind a viewer of a story to a scene when the reproduction is stopped.

Furthermore, it is also possible to resume the reproduction by using the stop picture address stored at the step S11 (refer to FIG. 3A). That is, when resuming the reproduction, after the processes until the step S22 (refer to FIG.4) are carried out, by detecting the sector address of the video stream VS inputted in a condition that the indication to the display and the like are kept off, by decoding the video stream VS and then by turning on the indication to the display and the like at a timing when the sector address coincident with the stop picture address stored at the above stopped point is detected, it is possible to resume the indication from the picture itself displayed when the reproduction is stopped.

(III) Second Embodiment

A second embodiment, which is another embodiment of solving the subjects of the present invention, is explained with reference to FIG. 1 and FIGS. 6 to 8. Incidentally, in FIGS. 6 and 8, the same step numbers are given to processes same as those of the first embodiment, and detailed explanations thereof are omitted.

The first embodiment is constituted so as to store the TC and TR of the display picture when the reproduction is stopped and to search the TC and TR which respectively coincide with the above mentioned TC and TR when resuming the reproduction. However, in the second embodiment, the reproduction is resumed by using a scan data file including information of sector addresses, which are recorded in advance on the video CD and represent the record positions on the video CD 1, of all I pictures in the video information recorded on the video CD 1.

(A) Operation During Reproducing

During reproducing in the second embodiment, the process as shown in FIG. 2 is not carried out. Since the reproduction is only carried out on the basis of the input of the normal video stream VS, explanations of detailed portions are omitted.

(B) Operation Then Reproduction Is Stopped

A reproduction stop operation in the second embodiment is explained with reference to FIGS. 1 and 6.

As shown in FIG. 6, in a case that the reproduction is to be stopped, when the reproduction stop order is inputted by the keyboard 21, the controller 8 stores, on the basis of the inputted video stream VS, the sector address located 0.5 seconds before (corresponding to the delay time explained in FIG. 3B) from the sector address of the picture read out from the video CD 1 when the reproduction stop order is inputted, as a reproduction stop sector address corresponding to the picture reproduced at the stopped point, into the backup memory 13 (Step S30). After that, the reproduction stop process similar to that of the first embodiment is carried out (Step S13).

(C) Operation Then Reproduction Is Resumed

An operation when resuming the reproduction in the second embodiment is explained with reference to FIGS. 1, 7 and 8.

When resuming the reproduction, it is resumed by using the above mentioned scan data file to thereby search the closest I picture to the sector address of the picture when the reproduction is stopped.

At first, a construction of the scan data file is explained with reference to FIG. 7.

As shown in FIG. 7, in the scan data file SC, common data is described in video CDs having the same content to each other on which the scan data file SC is recorded, and the sector addresses representing the record positions of all the I pictures are described in a later portion thereof.

The operation when resuming the reproduction is more actually explained with reference to FIG. 8.

Figure 8:
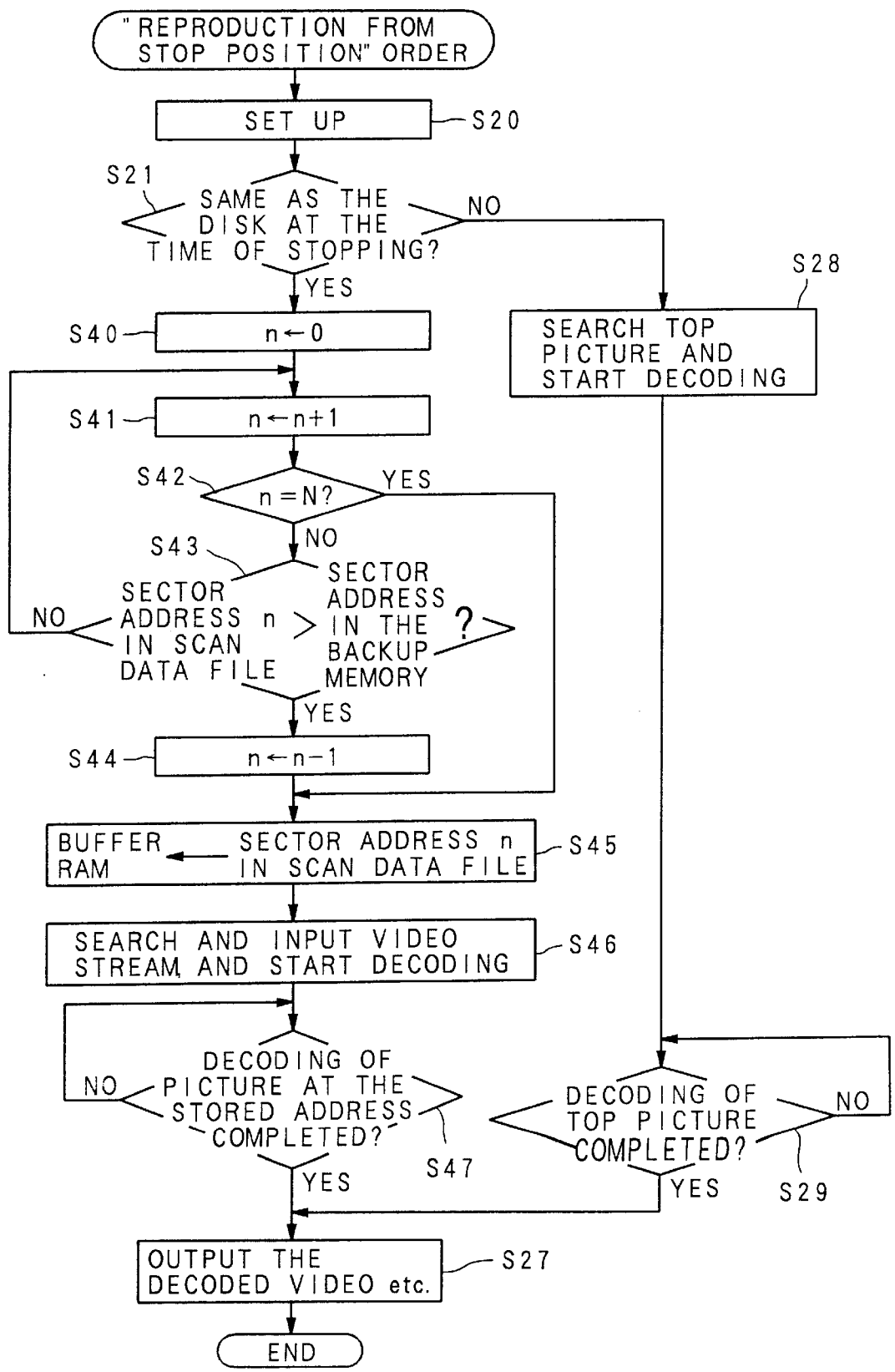
FIG. 8 is a flow chart showing an operation when resuming the reproduction in the second embodiment.

As shown in FIG. 8, at a time of resuming the reproduction, when the reproduction resumption order is inputted by the keyboard 21, the setup process (Step S20) is carried out, and also a judging operation is carried out whether or not it is the video CD 1 same as that at the stopped point (Step S21). In a case of the video CD 1 same as that at the stopped point (Step 821; YES), a parameter n (corresponding to the number n of the I picture within the scan data file SC) is initialized (Step S40). Then, the parameter n is incremented by [1] (Step S41). It is judged whether or not the parameter n coincides with the maximum value N of the numbers of the recorded I pictures (Step S42). If the parameter n coincides with the maximum value N, it is judged as the I picture immediately before the picture at the stopped point, and the operation is shifted to a step S45. If the parameter n does not coincide with the maximum value N (Step S42; NO), the stop picture address corresponding to the picture which was reproduced at the stopped point and stored in the backup memory 13 is compared with the sector address of the I picture having the number n within the scan data file (Step S43). If the stop picture address is not less than the sector address of the I picture having the number n within the scan data file (Step S43; NO), the I picture having the number n is judged not to be the I picture immediately before the stop picture address, and then the operation is returned to the step S41 in order to process an I picture having a next number.

On the other hand, in a case that the stop picture address is less than the sector address of the I picture having the number n within the scan data file (Step 843; YES), the I picture having the number n is an I picture immediately after the stop picture address, and thereby the parameter n is decremented by [1] (Step S44). The I picture whose number is the parameter n obtained in this way becomes the I picture immediately before the stop picture address. Then, the sector address of the I picture whose number is the parameter n after only [1] is decremented at the step S44 is read in from the scan data file SC, and stored in the buffer RAM 10 (Step 845). A record position on the video CD 1 corresponding to the stored sector address is searched, video information and audio information recorded thereon are detected, the video stream VS is inputted and the decoding is started (Step S46).

After that, the decoding of the I picture of the stored sector address is started (Step S47). The operation is waited until the decoding is completed (Step 847; NO). If completed (Step S47; YES), the reproduction is resumed from a picture thereof (Step S27). The indication to the display is turned on, and the picture display is resumed.

On the other hand, at the step S21, in a case that it is different from the video CD 1 when the reproduction is stopped (Step S21; NO), the decoding for reproducing from the top of the normal video CD is started similarly to the first embodiment (Step S28). The operation is waited until the decoding is completed (Step A29; NO). If completed (Step S29; YES), the reproduction is continued from a picture thereof (Step S27).

As mentioned above, according to the reproduction stop process and the reproduction resumption process of the second embodiment, the stop picture address detected from the video CD 1 when the reproduction is stopped is stored, and the sector address of the I picture immediately before is searched on the basis of the scan data file SC, and then the reproduction is resumed from the I picture immediately before. Thus, it is possible to reproduce from the GOP to which the displayed picture belongs when the reproduction is stopped. As a result, it is possible to resume the reproduction in the range in which the picture continuity is not damaged from the time when the reproduction is stopped.

Further, in a case of the second embodiment, the I picture of the GOP to which the displayed picture belongs when the reproduction is stopped is directly searched by using the scan data file, and the reproduction is resumed therefrom. As a result, it is possible to resume the reproduction faster than the first embodiment, in many cases.

(IV) Third Embodiment

A third embodiment, which is another embodiment of solving the subjects of the present invention, is explained with reference to FIG. 1 and FIGS. 9 and 10. Incidentally, in FIGS. 9 and 10, the same step numbers are given to processes same as those of the first embodiment, and detailed explanations thereof are omitted.

The first embodiment is constituted so as to store the TC and TR of the display picture when the reproduction is stopped and to search the TC and TR which respectively coincide with the above mentioned TC and TR when resuming the reproduction. However, the third embodiment is constituted so as to store a top sector address of the GOP including the pictured displayed when the reproduction is stopped, to start the reproduction from a portion corresponding to the stored top sector address when resuming reproduction and to display the picture from a top I picture of the GOP including the picture displayed when the reproduction is stopped.

(A) Operation During Reproducing And Then Reproduction Is Stopped

At first, operations during reproducing and when the reproduction is stopped in the third embodiment are explained with reference to FIGS. 1 and 9.

Figure 9:
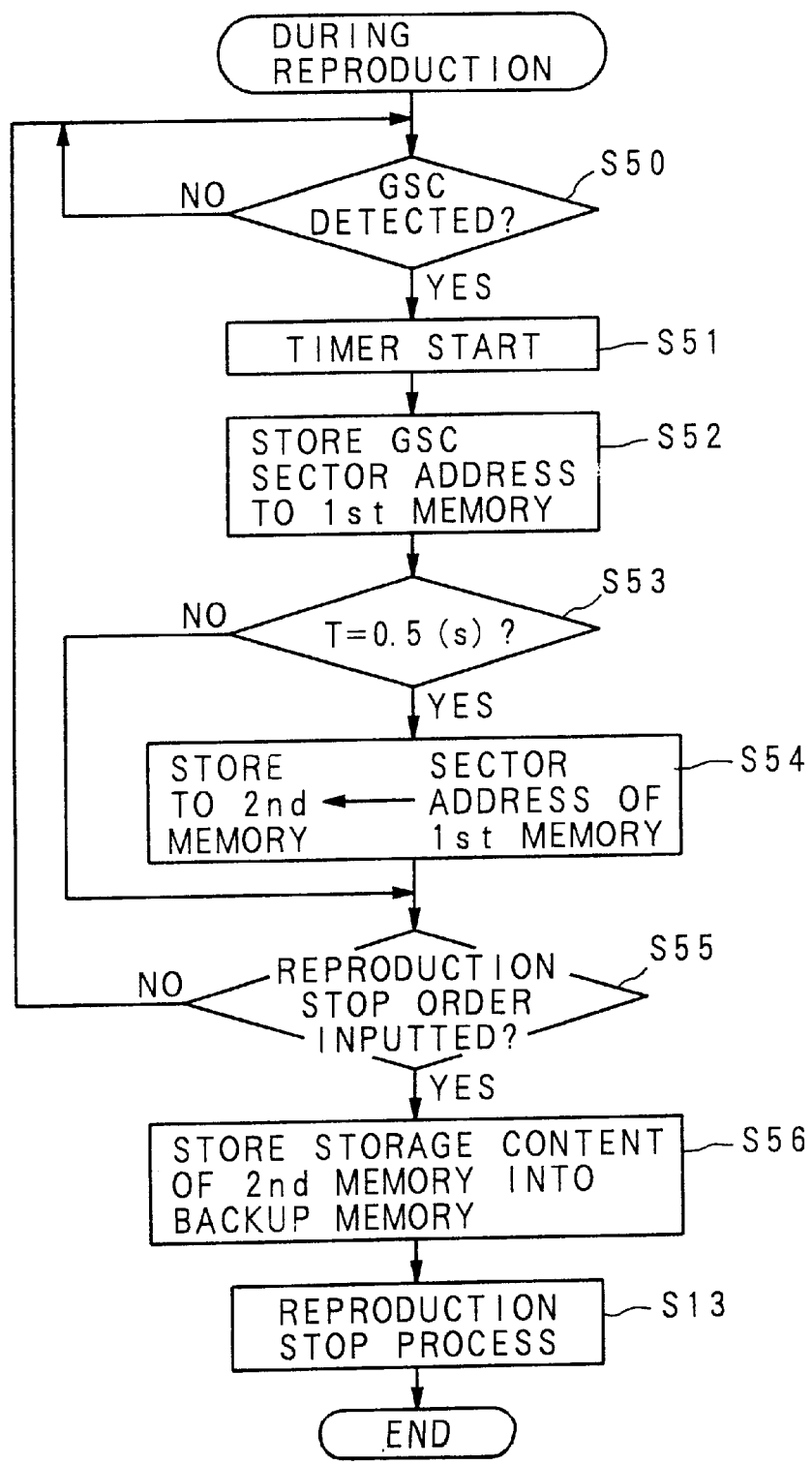
FIG. 9 is a flow chart showing an operation during reproducing and when a reproduction is stopped in a third embodiment.

As shown in FIG. 9, during reproducing in the third embodiment, at first, in the video purser 15A, it is judged whether or not GSC representing the top of each GOP is detected from the video CD 1 (Step 850). If the GSC is not detected (Step S50; NO), it is assumed that the reproduction of an intermediate portion of the GOP is in progress, and then the reproduction is continued while maintaining its original state. If the GSC is detected (Step 850; YES), the GOP layer interruption signal Sgr is outputted from the video purser 15A to the controller 8. This causes a timer included in the controller 8 to be started (Step A51).

When the timer is started (Step S51), a sector address of the detected GSC, namely, a top sector address of the GOP corresponding to the detected GSC is stored into a first memory area (not shown) in the buffer RAM 10 (Step S52). It is judged whether or not the timer started at the step S51 clocks 0.5 seconds (Step S53). If 0.5 seconds do not elapse (Step S53; NO), the operation is shifted to a step S55. If 0.5 seconds elapse (Step S53; YES), the sector address stored in the first memory area is stored into another second memory area (not shown) in the buffer RAM 10 (Step S54).

It is judged whether or not the reproduction stop order is inputted by the keyboard 21 (Step S55). If not inputted (Step S55; NO), the operations at the steps S50 to S54 are repeated. If inputted (Step S55; YES), the sector address stored in the second memory area is stored in the backup memory (Step S56). The reproduction stop process is carried out (Step S13), and the process is ended.

Here, at the steps S52 to S54, the reason why the top sector address of the GOP is moved from the first memory area to the second memory area after 0.5 seconds elapse from the detection of the GSC is described below. That is, there is the delay time of approximately 0.5 seconds, as explained in FIG. 3B, between the detection of the data from the video CD 1 and the display of the picture based on the detected data. Thus, in a case of storing the corresponding sector address when the GSC is detected and carrying out the reproduction stop process while maintaining its original state, when the reproduction stop order is inputted within 0.5 seconds from the detection of the GSC, the picture belonging to the one previous GOP of the GOP corresponding to the detected GSC is displayed as the actual picture display. However, the reproduction is started from the GOP corresponding to the GSC detected when resuming the reproduction. Thus, there may be a possibility that the continuity between the picture displayed actually when the reproduction is stopped and the picture when resuming the reproduction. Then, the sector address is stored in the second memory area after waiting by the above mentioned delay time at the step 853. Based thereon, the reproduction stop process is carried out. As a result, it is possible to surely store the sector address of the GSC of the GOP to which the displayed picture belongs when the reproduction is stopped.

(B) Operation Then Resuming Reproduction

An operation when resuming the reproduction in the third embodiment is explained with reference to FIGS. 1 and 10.

Figure 10:
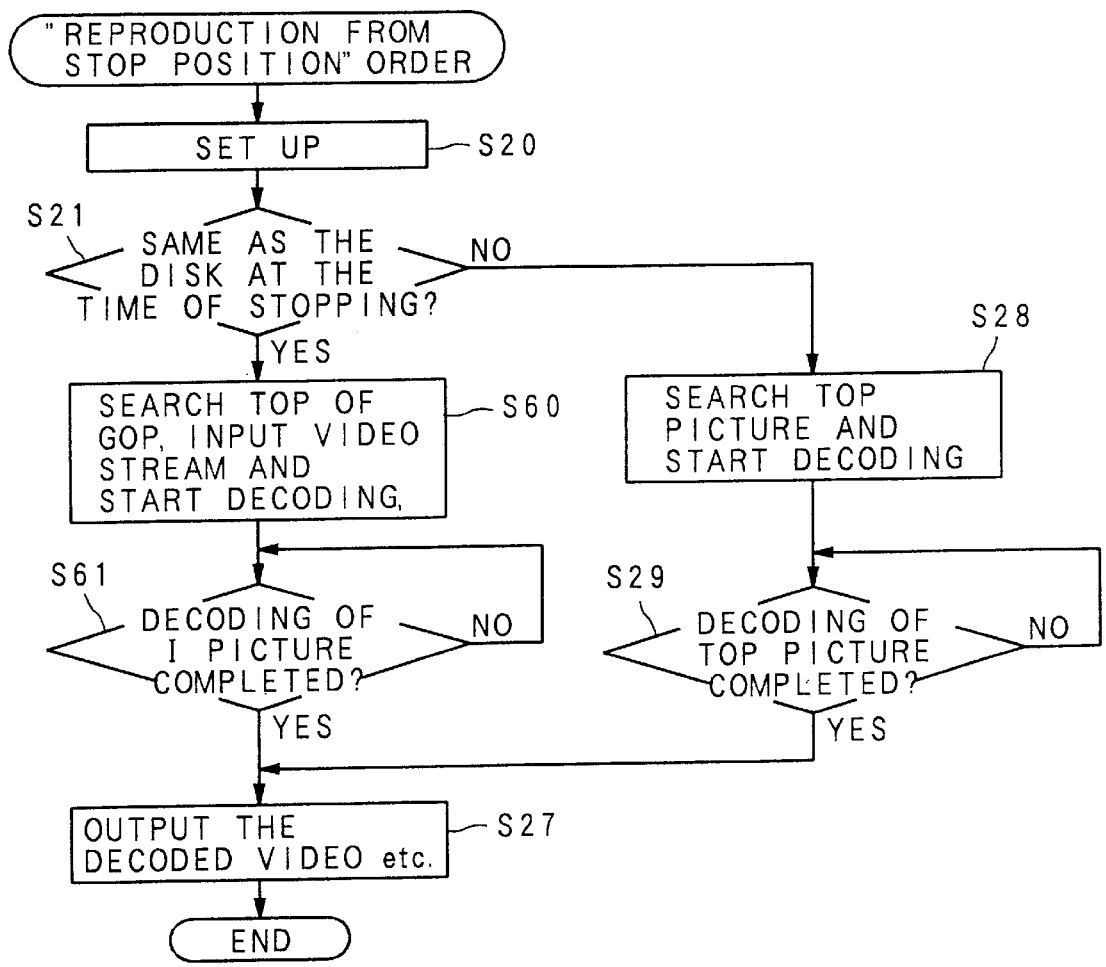
FIG. 10 is a flow chart showing an operation when resuming the reproduction in the third embodiment.

Then resuming the reproduction, as shown in FIG. 10, at a time of resuming the reproduction, when the reproduction resumption order is inputted by the keyboard 21, the setup process (Step S20) is carried out, and also a judging operation is carried out whether or not it is the video CD 1 same as that at the stopped point (Step S21). In a case of the same video CD as that at the stopped point (Step S21; YES), the top of the GOP corresponding to the GSC recorded in the position of the sector address is searched by using the sector address stored in the backup memory 13 since the stopped time (Step S60). The decoding is started in the decoder 15B from the searched I picture (Step S60). The operation is waited until the decoding of the I pictures exiting immediately after the search is completed (Step 861; NO). If the decoding is completed (Step S61; YES), the picture reproduction is resumed from the I picture thereof (Step S27). The indication to the display is turned on, and the picture display is resumed.

On the other hand, at the step S21, if judged that a video CD different from the video CD 1 when the reproduction is stopped is mounted (Step S21; NO), a top picture is searched in order to reproduce a normal video CD, the decoding is started (Step S28), and the operation is waited (Step S29; NO) until the decoding is completed. If completed (Step S29; YES), the reproduction after that point is continued (Step S27).

As mentioned above, according to the reproduction stop process and the reproduction resumption process of the third embodiment, the top sector address of the GOP including the picture displayed when the reproduction is stopped is stored, and the reproduction is started from the portion corresponding to the stored sector address when resuming the reproduction, and then the picture is displayed from the top I picture of the GOP including the picture displayed when the reproduction is stopped. As a result, the reproduction can be resumed in the range in which the picture continuity is not damaged from a time when the reproduction is stopped.

Also, in a case of this embodiment, the top address of the GOP to which the displayed picture belongs when the reproduction is stopped is directly searched, and then the reproduction is resumed from the top address. As a result, it is possible to resume the reproduction faster than the first embodiment, in many cases.

(V) Fourth Embodiment

A fourth embodiment, which is another embodiment of solving the subjects of the present invention, is explained with reference to FIG. 1 and FIGS. 11 to 13. Incidentally, in FIGS. 11 to 13, the same step numbers are given to processes same as those of the second and third embodiments, and detailed explanations thereof are omitted.

The second and third embodiments are constituted so as to search, on the basis of the information obtained by the operation when the reproduction is stopped, the I picture of the GOP to which the displayed picture belongs at the stopped point, at a time of resuming the reproduction, and to start the display from the picture corresponding to the I picture, to thereby resume the reproduction. However, in the fourth embodiment, when the reproduction is stopped, the I picture of the GOP, to which the displayed picture belongs at the stopped point, is searched, and then the reproduction is resumed on the basis thereof.

(A) Operation During Reproducing And Then Reproduction Is Stopped (i)

At first, an operation when the reproduction is stopped in an embodiment, in which the fourth embodiment is applied to the second embodiment, is explained with reference to FIG. 11.

Figure 11:
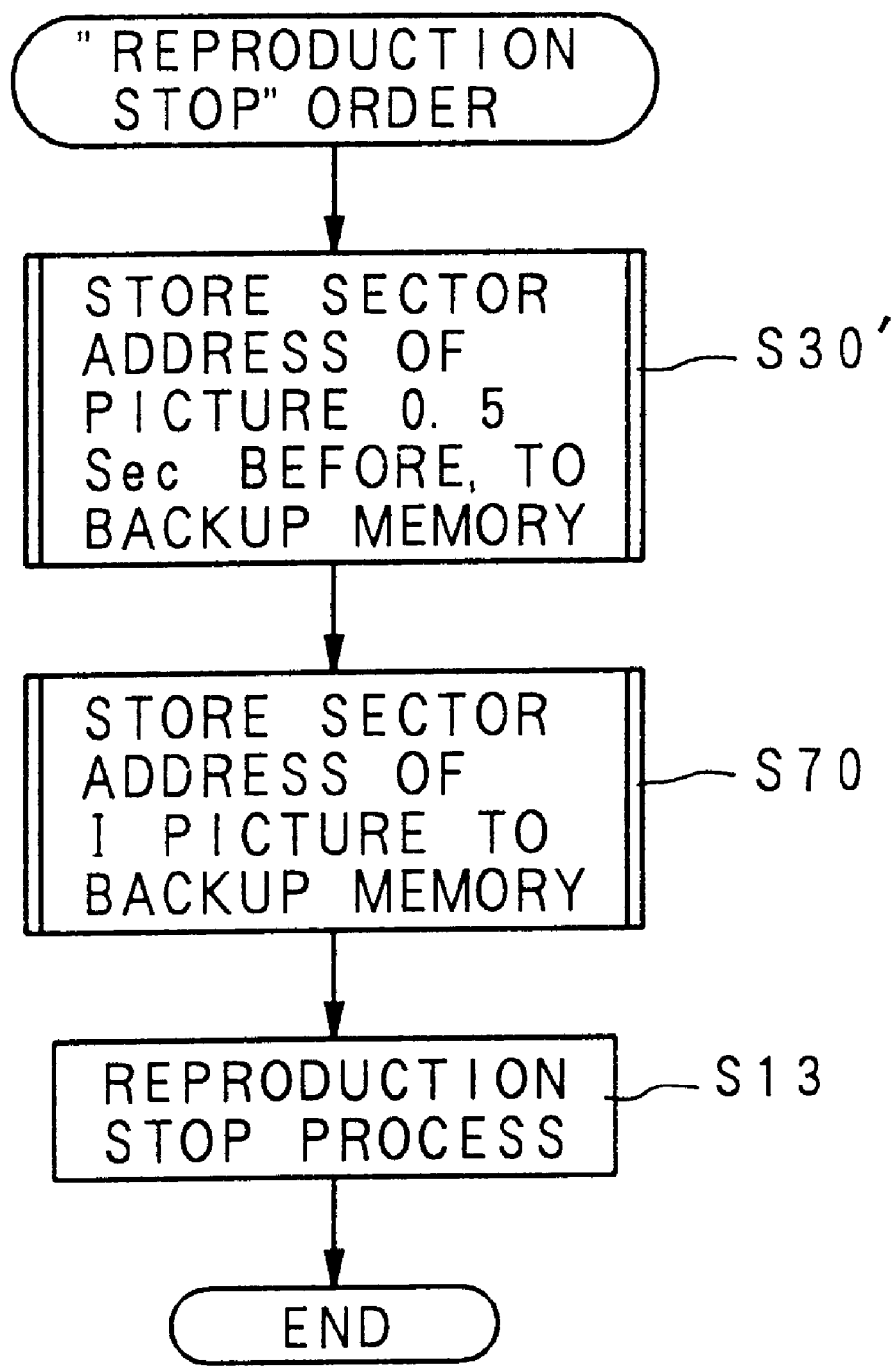
FIG. 11 is a flow chart showing an operation (i) when a reproduction is stopped in a fourth embodiment.

In the operation when the reproduction is stopped as shown in FIG. 11, when the reproduction stop order is inputted, the operation similar to that at the step S30 in the second embodiment (refer to FIG. 6) is carried out. A sector address of a picture located 0.5 seconds before in the recording sequence from the sector address of the picture, which is read out from the video CD 1 when the reproduction stop order is inputted, is detected (Step S30'). Then, a sector address of an I picture immediately before the detected picture is searched by using the scan data file shown in FIG. 7, and is stored into the backup memory 13 (Step S70). After that, the reproduction stop process is carried out (Step S13), and then the reproduction is ended.

(B)Operation During Reproducing And Then Reproduction Is Stopped
(ii )

Next, an operation when the reproduction is stopped in an embodiment, in which the fourth embodiment is applied to the third embodiment, is explained with reference to FIG. 12.

Figure 12:
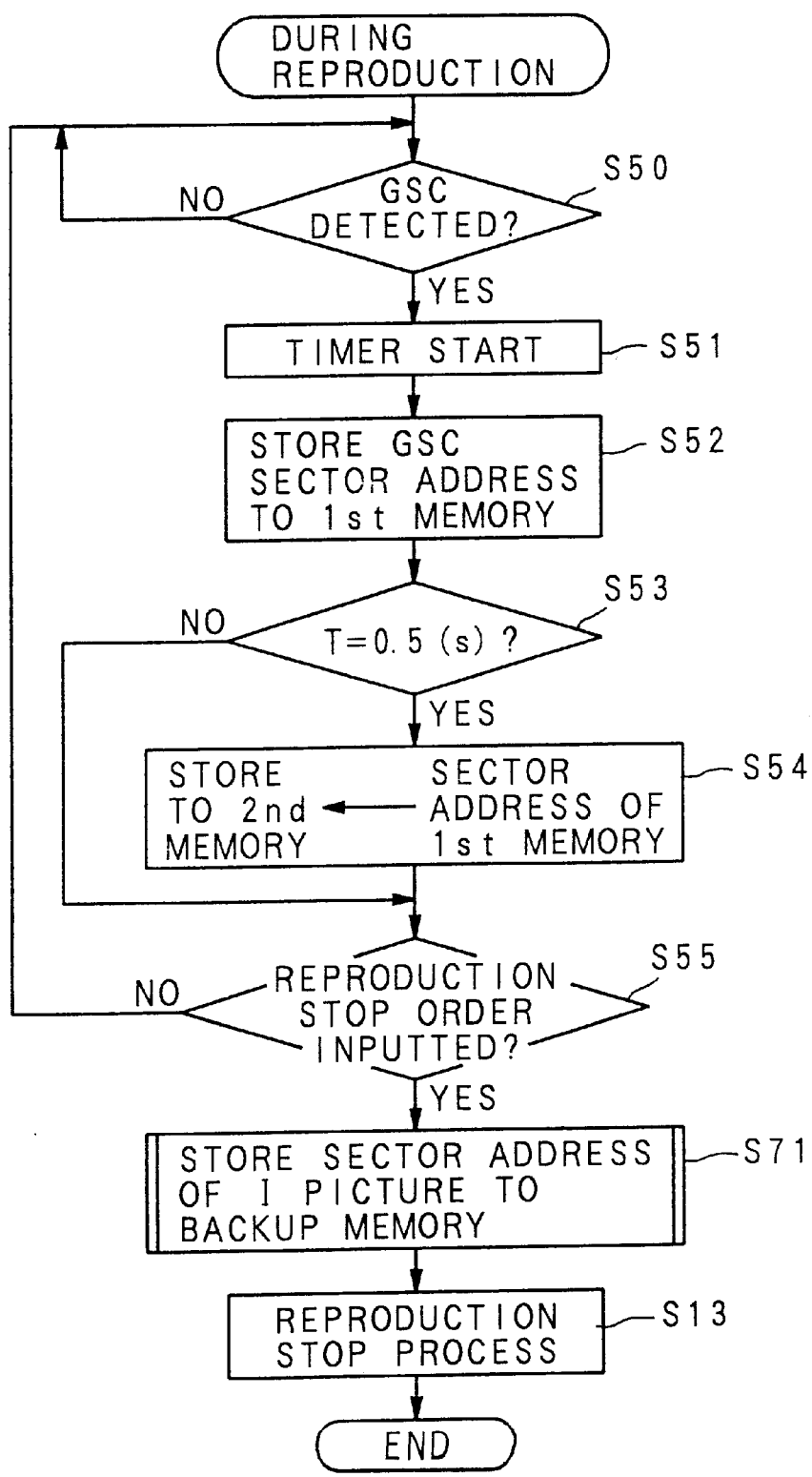
FIG. 12 is a flow chart showing an operation (ii) when the reproduction is stopped in the fourth embodiment.

During reproducing shown in FIG. 12, the operations at the steps S50 to S55 in the third embodiment (refer to FIG. 9) are carried out, and the operation is repeated in which the top sector address of the GOP to which the displayed picture belongs is stored into the second memory area.

When the reproduction stop order is inputted (Step S55; YES), the sector address of the I picture immediately before the sector address stored in the second memory area is searched by using the scan data file shown in FIG. 7, and stored into the backup memory 13 (Step S71). After that, the reproduction stop process is carried out (Step S13), and then the reproduction is ended.

(C) Operation Then Resuming Reproduction

An operation when resuming the reproduction in the fourth embodiment is explained with reference to FIG. 13.

Figure 13:
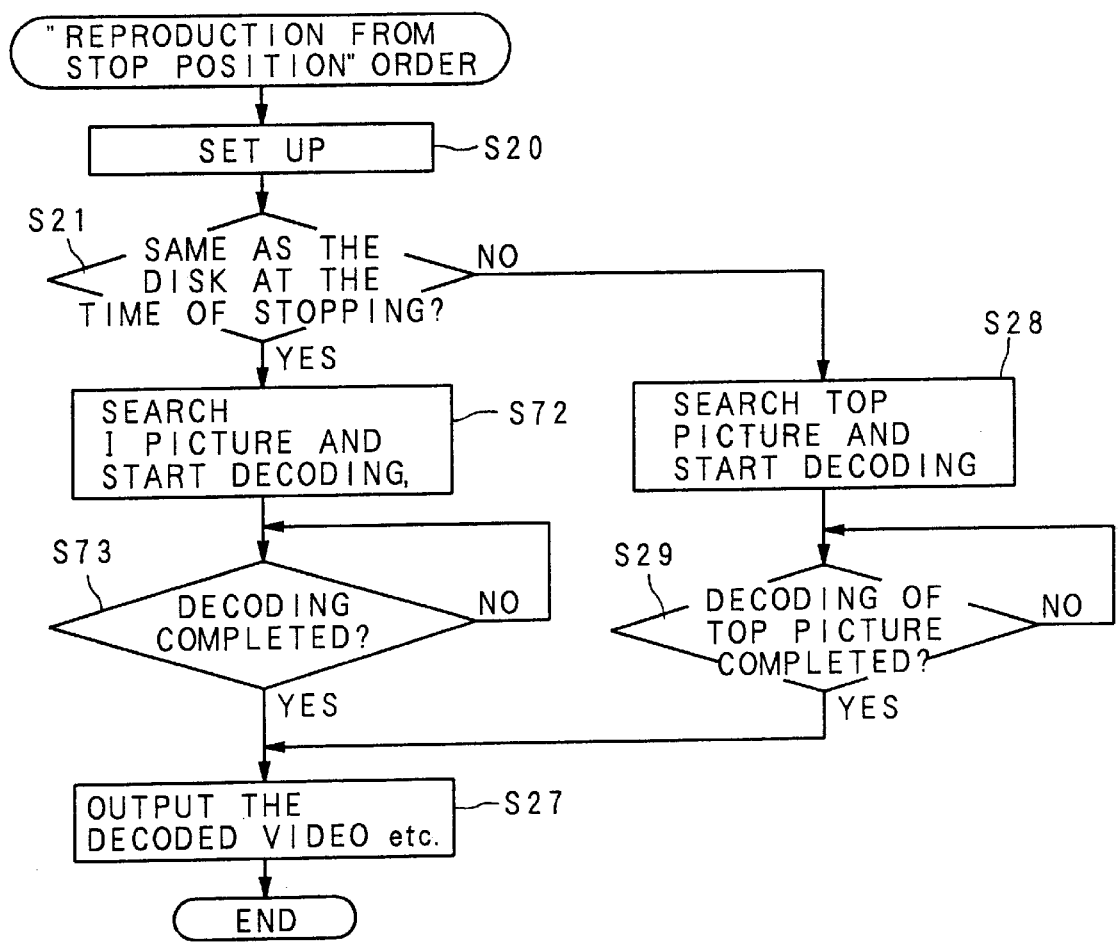
FIG. 13 is a flow chart showing an operation when resuming the reproduction in the fourth embodiment.

In the operation when resuming the reproduction shown in FIG. 13, the reproduction is resumed by using the address of the I picture stored in the operation shown in FIG. 11 or 12.

Then resuming the reproduction in the fourth embodiment, as shown in FIG. 13, at a time of resuming the reproduction, when the reproduction resumption order is inputted by the keyboard 21, the setup process (Step S20) is carried out, and also a judging operation is carried out whether or not it is the video CD 1 same as that at the stopped point (Step 821). In a case of the same video CD 1 as that at the stopped point (Step S21; YES), the I picture is searched by using the sector address of the I picture stored in the backup memory 13 at the stopped time, and the decoding is started from the searched I picture (Step S72). Then, it is judged whether or not the decoding is completed (Step S73). If not completed, the operation is waited until completed (Step S73; NO). If completed (Step S73; YES), the reproduction is resumed from the decoded picture (Step S27).

On the other hand, at the step S21, if judged that a video CD different from the video CD 1 when the reproduction is stopped is mounted (Step S21; NO), a top picture is searched in order to reproduce a normal video CD, the decoding is started (Step S28), and the operation is waited (Step S29; NO) until the decoding is completed. If completed (Step S29; YES), the reproduction after that point is continued (Step S27).

As explained above, according to the reproduction stop process and the reproduction resumption process of the fourth embodiment, when the reproduction is stopped, the sector address of the I picture immediately before the picture displayed at the stopped time is stored, and then the picture is displayed from the I picture corresponding to the sector address stored when resuming the reproduction on the basis of the above mentioned storing action. As a result, similarly to the second and third embodiments, the reproduction can be resumed in the range in which the picture continuity is not damaged from a time when the reproduction is stopped.

Also, in a case of this embodiment, the sector address of the I picture of the GOP, to which the displayed picture belongs when the reproduction is stopped, is directly searched, and the reproduction is resumed from the sector address. As a result, it is possible to resume the reproduction faster than the first embodiment, in many cases.

(VI) Fifth Embodiment

Next, a fifth embodiment is explained with reference to FIGS. 14 to 17.

The fifth embodiment is an embodiment of resuming the reproduction from the picture whose reproduction is stopped when the reproduction is stopped, in a video CD having the above mentioned PBC function (hereafter, referred to as a PBC video CD). Incidentally, in FIGS. 16 and 17, the same step numbers are given to processes same as those of the second and third embodiments, and detailed explanations thereof are omitted.

Now, before actually explaining the reproduction stop process and the reproduction resumption process, a construction of information stored in the PBC video CD is explained with reference to FIG. 14.

Figure 14:
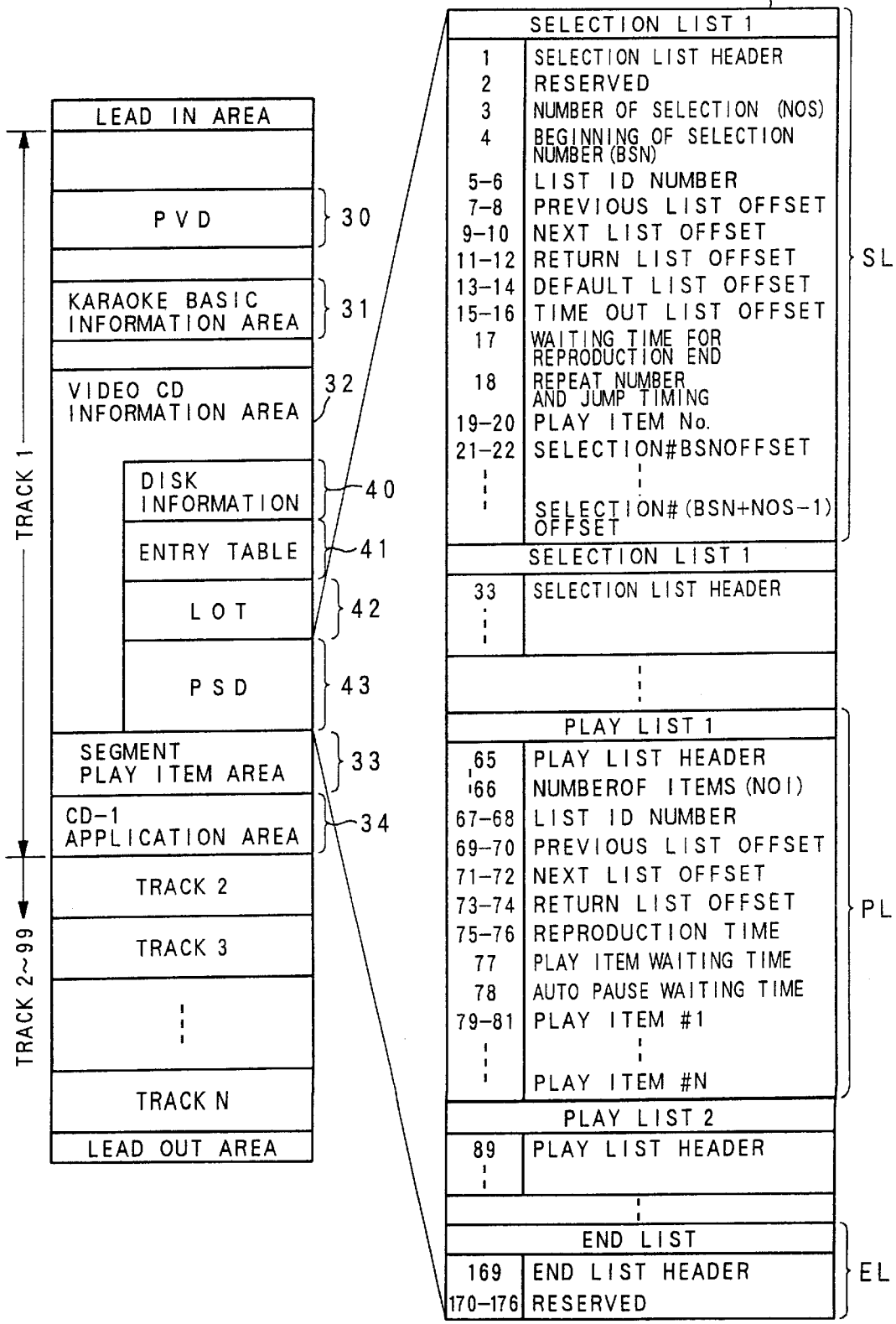
FIG. 14 is a diagram showing a record construction of a PBC video CD.

As shown in a left side of FIG. 14, various informations with respect to the video CD are recorded on a track 1, which is located at the most inner circumference of the PBC video CD. The respective informations are schematically explained hereafter.

At first, management information, such as a file construction and the like, which is recorded on the PBC video CD is recorded on a PVD (Primary Volume Descriptor) 30.

Next, information necessary for compatibility with a KARAOKE (music accompaniment playing) CD is described on a KARAOKE basic information area 31.

Information with respect to a requirement as the video CD, including a PST 43 which directly contributes to implementing of the PBC function is described on a video CD information area 32. The information of the video CD information area 32 is described later in detail.

Information, such as a static picture, a menu screen, a dynamic picture, a tone and the like, specified by the PST 43 described later is described on a segment play item area 33.

Information necessary for compatibility with a CD-I disk (a CD which can record a picture, data, a character and the like in addition to audio information and interactively provide the user with information) is described on a CD-I (Compact Disk-Interactive) application area 34.

A main body of the video information or the like, such as the dynamic picture and the like, recorded on the video CD is described on tracks 2 to N of the PBC video CD.

Next, information described within the video CD information area 32 is explained.

At first, basic information as the video CD, such as a size of a PST area, a start address of the segment play item area 33 and the like is described on a disk information area 40.

A table of an entry point to start the reproduction from an inside (middle) of the dynamic picture on and after the track 2 is described on an entry table 41.

Sector addresses representing record start positions on the video CD of a selection list SL and a play list PL, as a selection reproduction list described later, are described on an LOT (List ID Offset Table) 42, as shown in FIG. 15, in which the sector address corresponds to a list ID representing each list.

As shown in a right side of FIG. 14, the PST 43 roughly describes the selection list SL of displaying the menu screen and the like and branching into lists corresponding to numeral keys (selection numbers) selected by the user, the play list PL of describing a plurality of play items (the dynamic picture or the static picture) which are continuously reproduced, and an end list EL of representing the end of the reproduction. The selection list SL has a hierarchical construction in a form of a tree.

Among them, as shown in the right side of FIG. 14, there are a plurality of the selection lists SL, with a selection list 1 as a top. Each of the selection lists SL contains: a selection list header (a value thereof is normally $18. ([$] represents a hexadecimal number.)) representing the beginning of the selection list SL; a number of selections representing the number of the selections described in each of the selection lists SL; a beginning of a selection number representing a number of a first selection in the selection; a list ID number inherent in each of the selection lists SL; a previous list offset representing an offset address from the beginning of the PST 43 of the list to be carried out in a case that a PREVIOUS key is pushed on the keyboard 21; a next list offset representing an offset address from the beginning of the PST 43 of the list to be carried out in a case that a NEXT key is pushed on the keyboard 21; a return list offset representing an offset address from the beginning of the PST 43 of the list to be carried out in a case that a RETURN key is pushed on the keyboard 21; a default list offset representing an offset address from the beginning of the PST 43 of the list to be carried out in a case that a DEFAULT key is pushed on the keyboard 21; a time out list offset representing an offset address from the beginning of the PST 43 of a time out list on which a time-out time and the like are described; a waiting time for reproduction end representing a waiting time at a time of the reproduction end of a play item specified by each of the selection lists SL; a repeat number and jump timing representing a reproduction number of a play item specified by each of the selection lists SL; a play item number representing a play item specified by each of the selection lists SL; and a selection offset representing an offset address from the beginning of the PST 43 of the list to be carried out in a case that a numeral key is pushed on the keyboard 21. In the above mentioned configuration, it is possible to implement the selection list SL having the hierarchical construction as a whole, by specifying another selection list SL as a list to be carried out.

Further, as shown in the right side of FIG. 14, there are a plurality of the play lists PL, with a play list 1 as a top. Each of the play lists PL contains: a play list header (a value thereof is normally $10.) representing the beginning of the play list PL; a number of items representing the number of play items described in each of the play lists PL; a list ID number inherent in each of the play lists PL; a previous list offset representing an offset address from the beginning of the PST 43 of the list to be carried out in a case that the PREVIOUS key is pushed on the keyboard 21; a next list offset representing an offset address from the beginning of the PST 43 of the list to be carried out in a case that the NEXT key is pushed on the keyboard 21; a return list offset representing an offset address from the beginning of the PST 43 of the list to be carried out in a case that the RETURN is pushed on the keyboard 21; a reproduction time representing a total reproduction time of a play item specified by each of the play lists PL; a play item waiting time which is a waiting time after each of play items is reproduced; an auto pause waiting time representing a waiting time in a case that an auto pause is induced while each of play items is reproduced; and a play item number representing each of play items specified by the play list PL.

Furthermore, as shown in the right side of FIG. 14, only one end list EL exists in one PST 43. The end list EL contains an end list header (a value thereof is normally $1F.) representing the beginning of the end list EL.

As for a mutual relation between the respective lists mentioned above, for example, in a case that the PST of the PBC video CD 1 to be reproduced is arranged from the selection list 1 such as the PST 43 shown in FIG. 14, when the normal reproduction is started, the controller 8 reads in this first selection list to thereby carry out the operations based on this list. At this time, in a case that the play item specified by the play item number within the selection list 1 is the menu screen within the segment play item area 33, it is reproduced and indicated on the display and the like. Each of selection branches indicated within the menu screen corresponds to each of the selections within the selection list 1. A selection destination corresponding to each of the selection branches is described within the selection list 1 as the selection offset. If the user selects according to the selection branch, the controller 8 detects the play list PL corresponding to the selection offset selected by the user and the like. Then, the play item described therein (the dynamic picture as the main body of the video information described on and after the track 2 and the like) is reproduced.

If the end list EL is selected on the menu screen, the reproduction is ended while maintaining its state.

By virtue of the PST 43 including the respective lists as mentioned above, it is possible to enable various access performances for the user as the above mentioned PBC function.

The reproduction stop process and the reproduction resumption process in the PBC video CD 1 of the fifth embodiment are explained with reference to FIGS. 16 and 17.

(A) Operation During Reproducing And Then Reproduction Is Stopped

At first, while the PBC video CD 1 is reproduced, the controller 8 repeats the operation of storing the list ID number of the list which is reproduced and carried out, each time a list to be carried out is changed.

Figure 16:
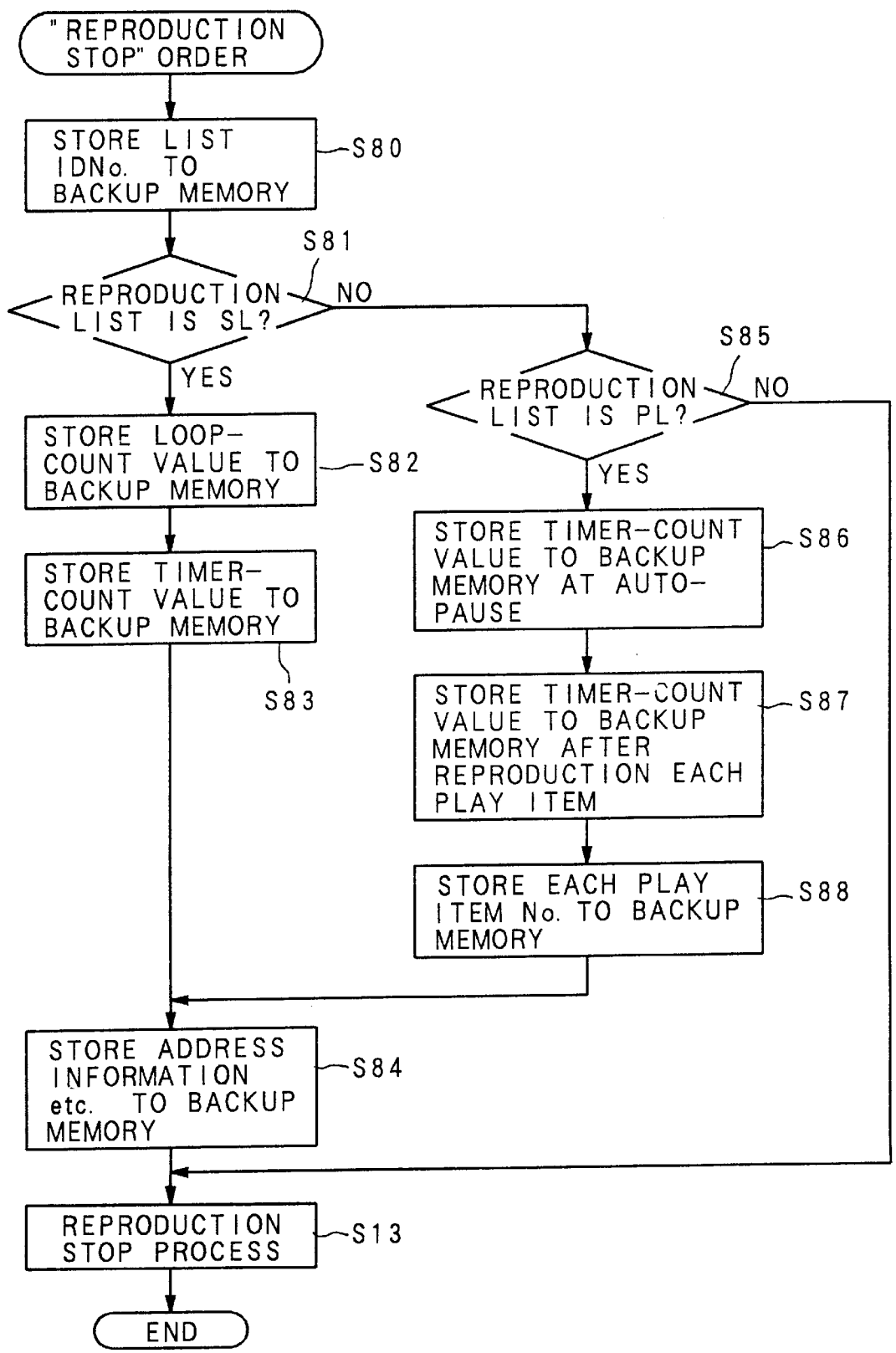
FIG. 16 is a flow chart showing an operation when a reproduction is stopped in a fifth embodiment.

When the reproduction stop order is inputted by the keyboard 21 as shown in FIG. 16, the list ID number reproduced at that point is stored in the backup memory 13 (Step S80). Then, it is judged whether or not a list having the stored list ID number is the selection list SL, by detecting a header of the list (Step S81). In a case that the reproduced list is the selection list SL (Step S81; YES), a value of a counter representing an already repeated number, among the repeat reproduction numbers (i.e. the loop counts) within the selection list SL (refer to FIG. 14), is stored into the backup memory 13 (Step S82). A value of another timer counter representing an already elapsed time, among the waiting time for reproduction end (refer to FIG. 14) is stored into the backup memory 13 (Step S83).

After that, by means of the process when the reproduction is stopped in the above mentioned first to fourth embodiments (refer to FIG. 3, 6, 9, 11 or 12), the sector address etc. to resume the reproduction from the picture, which is reproduced when the reproduction is stopped or from the GOP, to which the picture belongs when the reproduction is stopped, is stored into the backup memory 13 (Step S84), and then the reproduction stop process (the step S13) similar to that of the first embodiment is carried out and then the process is ended.

On the other hand, in a case that the reproduced list is not the selection list SL at the step S81 (Step S81; NO), it is judged whether or not the reproduced list is the play list PL, by detecting a header of the list (Step S85). In a case that it is the play list PL (Step S85; YES), a value of a timer counter for clocking an already elapsed time, among the waiting time (the auto pause waiting time (refer to FIG. 14)) when the auto pause is induced while the play item within the play list PL is reproduced is stored in the backup memory 13 (Step S86). Next, a value of another timer counter for clocking an already elapsed time, among the waiting time (the play item waiting time (refer to FIG. 14)) of waiting after each of the play items is reproduced, is stored into the backup memory 13 (Step S87). And, the play item number (refer to FIG. 14) of the reproduced play item is stored into the backup memory 13 (Step S88). More actually explaining the process at the step S88, in order to specify a number of the stored play item, a pointer of pointing out which (what number) of the play item among the play lists PL is reproduced is stored into the backup memory 13. After that, the operations similar at the steps S84 and S13 are carried out, and then the process is ended.

In a case that the reproduced list is not the play list PL in the process at the step S85 (Step S85; NO), the reproduced list is assumed to be the end list EL, and the reproduction end process (the step S13) is carried out as it is. Then, the process is ended.

(B) Operation Then Resuming Reproduction

An operation when resuming the reproduction in the fifth embodiment is explained with reference to FIG. 17.

In a case of resuming the reproduction in the fifth embodiment, as shown in FIG. 17, when at first the reproduction resumption order is inputted by the keyboard 21, the setup process is carried out (the step S20). After that, it is judged whether or not it is the PBC video CD 1, by referring to the PVD (refer to FIG. 14) and the like (Step S90). In a case that it is not the PBC video CD 1 (Step S90; NO), the operation is carried out such that the reproduction resumption processes in the above mentioned first to fourth embodiments correspond to that when the reproduction is stopped (Step S91). On the other hand, in a case that it is the PBC video CD 1 (Step S90; YES), it is judged whether or not it is the same PBC video CD 1 as that at the stopped point (Step S21). If it is not the same PEC video CD 1 as that at the stopped point (Step S21; NO), the process of reproducing the video CD from the beginning thereof is carried out (Step S92).

In the process at the step S21, in a case that it is the same PBC video CD 1 as that at the stopped point (Step S21; YES), the list ID number stored when the reproduction is stopped (refer to the step S80 of FIG. 16) is specified (Step S93). By reading the LOT 42 (refer to FIGS. 14 and 15) from the PBC video CD 1, an offset address is obtained for reading in a list corresponding to the list ID number specified at the step S93 (Step S94). After that, by reading in the PST 43 (refer to FIG. 14), a list recorded on the offset address obtained at the step S94 is specified (Step S95). Then, it is judged whether or not the list is the selection list SL, on the basis of a list header of the list (Step S96).

In a case that the list specified at the step S95 is the selection list SL (Step S96; YES), the values of the timer counters stored in the backup memory 13 at the steps S82 and S83 (refer to FIG. 16) when the reproductions are stopped are respectively stored in the buffer RAM 10 (Steps S97 and S98). Then, the play item corresponding to the play item number specified within the selection list SL is reproduction-resumed from the picture when the reproduction is stopped (Step S99), by referring to the values stored at the steps S97 and S98. Incidentally, the method of resuming the reproduction from the picture when the reproduction is stopped at the step S99 corresponds to the operation at the step S84 when the reproduction is stopped, and the method of resuming the reproduction in the above mentioned first to fourth embodiments is carried out. After that, the later processes except the processes in which the initial settings at the steps S97 to S99 are carried out, among the selection list processes of the reproduced PBC video CD 1, are carried out, and then it is returned to the reproduction state similar to that before the reproduction is stopped (Step S100).

On the other hand, in a case that the list specified at the step S95 is not the selection list SL (Step S96; NO), it is judged whether or not it is the play list PL, on the basis of a list header of the list (Step S101). In a case that it is the play list PL (Step S101; YES), the values of the timer counters stored in the backup memory 13 at the steps S86 and S87 (refer to FIG. 16) when the reproductions are stopped are respectively stored into the buffer RAM 10 (Steps S102 and S103). After that, a play item corresponding to the play item number stored in the backup memory when the reproduction is stopped (refer to the step S88 of FIG. 16) is reproduction-resumed from the picture when the reproduction is stopped by referring to the values stored at the steps S102 and S103 (Step S104). Incidentally, the method of resuming the reproduction from the picture when the reproduction is stopped at the step S104 corresponds to the operation at the step S84 when the reproduction is stopped, and the method of resuming the reproduction in the above mentioned first to fourth embodiments is carried out. After that, the later processes except the processes in which the initial settings at the steps S102 to S104 are carried out, among the play list processes of the reproduced PBC video CD 1, are carried out, and then it is returned to the reproduction state before the reproduction is stopped (Step S105).

In the judgment at the step S101, if judged that it is not the play list PL (Step S101; NO), the list specified at the step S95 is assumed to be the end list EL, and the reproduction end process is carried out as it is (Step S13). Then, the process is ended.

As mentioned above, according to the fifth embodiment, the list ID number reproduced when the reproduction is stopped at the PBC video CD 1 and the like is stored and the reproduction is resumed so as to carry out the remaining list processes from the list processes at the stopped point, on the basis of the stored list ID number, when resuming the reproduction. Thus, even in a case of using the PBC video CD 1, similarly to the above mentioned respective embodiments, the reproduction can be resumed in the range in which the picture continuity is not damaged from a time when the reproduction is stopped.

Many selection branches are prepared in the PBC video CD 1 on which video information for a game and an education lesson are recorded, and many hierarchies are constituted therein, in many cases. However, according to this embodiment, even if the reproduction is stopped at a deep hierarchy, instead of carrying out an initial procedure until the hierarchy when the reproduction is stopped is reached, the reproduction can be resumed quickly from the hierarchy itself at which the reproduction is stopped.

Further, according to this embodiment, the information indicating the elapsed situations, such as the repeat reproduction number, the various waiting times and the like, are stored when the reproduction is stopped. Thus, the reproduction can be resumed from the same condition as the reproduction situation when the reproduction is stopped, at a time of resuming the reproduction. As a result, it is possible to solve such a trouble that the same reproducing processes are repeated when stopping the reproduction and when resuming the reproduction.

(C) Variation Embodiment Of Fifth Embodiment

The fifth embodiI~1ent as mentioned above is adapted so as to store the list ID number under reproducing when the reproduction is stopped to thereby resume the reproduction from the list corresponding to the stored list ID number when reproduced. However, as the other embodiment providing the effect similar to the fifth embodiment, in the PBC video CD 1, it may be constructed store into the backup memory 13 the offset address of the list under reproducing when the reproduction is stopped and to firstly read in the PST 43 when resuming the reproduction and to read out the list (that is, the list under reproducing when the reproduction is stopped) stored in the position of the offset address stored at the stopped point, from the top of the PST 43, to thereby resume the reproduction.

It may be also constructed to store into the backup memory 13 the offset address and the PST 43 of the list under reproducing when the reproduction is stopped to thereby resume the reproduction from the list (that is, the list under reproducing when the reproduction is stopped) stored in the position of the offset address stored at the stopped point, from the top of the PST 43 stored when the reproduction is stopped, at a time of resuming the reproduction.

Further, it may be constructed to store into the backup memory 13 the list ID number and the play item number of the selection list SL or the play list PL under reproducing when the reproduction is stopped, to thereby resume the reproduction from the tops of the list and the play item specified by the list ID number and the play item number stored when the reproduction is stopped, at a time of resuming the reproduction.

By the constructions as mentioned above, it is possible to resume the reproduction in the range in which the picture continuity is not damaged from a time when the reproduction is stopped.

Incidentally, in the above mentioned second to fifth embodiments, in addition to the configurations of the respective embodiments, it is possible to store the TR of the picture reproduced at the point when the reproduction is stopped (the actual method is based on the first embodiment) to thereby resume the reproduction from the reproduction-stopped picture itself on the basis of the stored TR at a time of resuming the reproduction.

Similarly, in the second to fifth embodiments, by storing the above mentioned stop picture address corresponding to the picture reproduced when the reproduction is stopped, inputting the video stream VS at a time of resuming the reproduction to thereby start the decoding, then detecting the sector address of the video stream VS inputted while the indication to the display is kept off, and turning on the indication to the display at a timing of detecting the sector address coinciding with the stop picture address stored at the above mentioned stopped point, it is possible to resume the indication from the picture itself displayed when the reproduction is stopped.

As described above in detail, according to the present embodiments, the continuity of the reproduced pictures can be maintained between the reproduced picture before stopping and the reproduced picture after resuming, even in a case of reproducing the compressed video information, in which the intra-frame-coded pictures (such as the I picture) and the predictive-coded pictures (such as the P and B pictures) are mixed, such as a video CD recorded by the MPEG1 method. Further, it is possible to resume the reproduction of the picture itself, which has been stopped, according to the present embodiments. Furthermore, even in a case of the compressed video information with the selection reproduction list, such as the video CD with the PBC function, the continuity of the reproduced pictures can be maintained.

In the above embodiments, the record medium is the video CD, and the compression recording method is the MPEG1 method. However, the present invention is not limited to these. For example, the present invention may be adapted to the DVD (Digital Video Disk) as the record medium and the MPEG2 method as the compression recording method.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. Apparatus for stopping reproduction of video information from a record medium on which the video information is recorded, the video information comprising a plurality of picture groups, each of which has an identifying group index, each of the picture groups having a plurality of pictures compressed by intra-frame-coding or predictive-coding, said apparatus comprising:
    a group index detection means for detecting the group index which identifies a picture being reproduced when a reproduction stop signal occurs;
    a group index memory for storing said detected group index;
    a record position detection means for detecting the record position when the reproduction stop signal is inputted and for outputting record position information representing the detected record position; and
    a record position memory for storing the record position information.

2. An apparatus as in claim 1, wherein:
said detected group index includes a time code which represents elapsed time from a beginning of video information on the record medium to the picture group identified by the detected group index.

3. An apparatus as in claim 1, wherein:
each of the pictures is provided with an identifying picture index and said apparatus further comprises:
    a picture index detection means for detecting the picture index which identifies the picture being displayed when the reproduction stop signal is inputted; and
    a picture index memory for storing said detected picture index.

4. An apparatus as in claim 3, wherein said detected picture index includes a temporal reference which represents picture display order from a first picture within said detected picture group.

5. An apparatus as in claim 1, wherein each of said group index memory and said record position memory comprises a non-volatile memory.

6. Apparatus for stopping reproduction of video information from a record medium on which the video information and selection reproduction information are recorded, the video information comprising a plurality of picture groups, each of which has an identifying group index and a plurality of pictures, each of which pictures is compressed by intra-frame-coding or predictive-coding, the selection reproduction information comprising a plurality of lists and a list identifier identifying each of the lists, the lists respectively prescribing reproduction orders of parts of the video information so as to select partial video information to be reproduced, said apparatus comprising:
    a list identifier detection means for detecting, from the selection reproduction information, one list identifier which identifies a list corresponding to the picture displayed when a reproduction stop signal is inputted; and
    a list identifier memory for storing said detected list identifier.

7. An apparatus as in claim 6, wherein
the selection reproduction information further comprises a plurality of partial video information numbers respectively indicating partial video information to be selectively reproduced, and
said apparatus further comprises:
    a partial video information number detection means for detecting a partial video information number corresponding to partial video information including said picture displayed when the reproduction stop signal is inputted;
    a partial video information number memory for storing said detected partial video information number;
    a group index detection means for detecting the group index which identifies the picture group including the picture displayed when the reproduction stop signal is inputted;
    a group index memory for storing said detected group index;
    a record position detection means for detecting the record position when the reproduction stop signal is inputted and for outputting record position information representing the detected record position; and
    a record position memory for storing the outputted record position information.

8. An apparatus as in claim 7, wherein:
each of the pictures is provided with an identifying picture index and
said apparatus further comprises:
    a picture index detection means for detecting the picture index which identifies the picture displayed when the reproduction stop signal is inputted; and
    a picture index memory for storing said detected picture index.

9. Apparatus for stopping and resuming reproduction of video information from a record medium on which the video information is recorded, the video information comprising a plurality of picture groups, each of which has an identifying group index and a plurality of pictures, each of which pictures is compressed by intra-frame-coding or predictive-coding, said apparatus comprising:
    a group index detection means for detecting the group index which identifies the picture group including the picture displayed when a reproduction stop signal is inputted;
    a group index memory for storing said detected group index;
    a record position detection means for detecting the record position of said displayed picture on the record medium when the reproduction stop signal is inputted and for outputting record position information representing the detected record position;

a record position memory for storing the outputted record position information;

a reading means for reading video information from a record position corresponding to a prior recording order time from the record position represented by the record position information stored in said record position memory when a reproduction resumption signal is inputted;

a group detection means for detecting the picture group having a group index coincident with the group index stored in said group index memory using the video information read by said reading means; and a reproduction resuming means for resuming reproduction on the basis of the intra-frame-coded picture within the detected picture group among the video information read by said reading means.

10. An apparatus as in claim 9, further comprising:

a judging means for judging whether or not the record medium, which is engaged with said apparatus when the reproduction resumption signal is inputted, is same as that engaged with the apparatus when the reproduction stop signal was inputted.

11. An apparatus as in claim 9, wherein said detected group index comprises a time code which represents elapsed time from a beginning of video information on the record medium until the reproduction occurrence of said detected picture group.

12. An apparatus as in claim 9, wherein each of the pictures is provided with an identifying picture index and said apparatus further comprises:

a picture index detection means for detecting the picture index which identifies the picture displayed when the reproduction stop signal is inputted;

a picture index memory for storing said detected picture index; and a picture detection means for detecting the picture having a picture index coincident with the picture index stored in said picture index memory within the detected picture group, said reproduction resuming means resuming reproduction from the detected picture using the intra-frame-coded picture within the detected picture group and the detected picture.

13. An apparatus as in claim 12, further comprising:

a judging means for judging whether or not the record medium, which is engaged with said apparatus when the reproduction resumption signal is inputted, is same as that engaged with the apparatus when the reproduction stop signal was inputted.

14. An apparatus as in claim 12, wherein said detected picture index comprises a temporal reference which represents picture display order from a first picture within said detected picture group.

15. Apparatus for stopping and resuming reproduction of video information from a record medium on which video information and selection reproduction information are recorded, the video information comprising a plurality of picture groups, each of which has an identifying group index and a plurality of pictures, each of which pictures is compressed by intra-frame-coding or predictive-coding, the selection reproduction information comprising a plurality of lists and a list identifier identifying each of the lists, the lists respectively prescribing reproduction orders of parts of the video information so as to select partial video information to be reproduced, said apparatus comprising:

a list identifier detection means for detecting, from the selection reproduction information, one list identifier which identifies a list corresponding to the picture displayed when a reproduction stop signal is inputted;

a list identifier memory for storing said detected list identifier;

a list detection means for detecting the list corresponding to the picture displayed when the reproduction stop signal was inputted, on the basis of the stored list identifier when a reproduction resumption signal is inputted; and a reproduction resuming means for resuming reproduction of partial video information in the reproduction order prescribed by the detected list.

16. An apparatus as in claim 15, further comprising:

a judging means for judging whether or not the record medium engaged with said apparatus when the reproduction resumption signal is inputted is same as that engaged with the apparatus when the reproduction stop signal was inputted.

17. An apparatus as in claim 15, wherein:

the selection reproduction information further comprises a plurality of partial video information numbers respectively indicating partial video information to be selectively reproduced, and said apparatus further comprises:

a partial video information number detection means for detecting the partial video information number which indicates partial video information including the picture displayed when the reproduction stop signal is inputted;

a partial video information number memory for storing said detected partial video information number;

a group index detection means for detecting the group index which identifies the picture group including the picture displayed when the reproduction stop signal is inputted;

a group index memory for storing said detected group index;

a record position detection means for detecting the record position when the reproduction stop signal is inputted and for outputting record position information representing the detected record position;

a record position memory for storing the detected record position information;

a specifying means for specifying the partial video information displayed when the reproduction stop signal was inputted using the detected list and the partial video information number stored in said partial video information number memory;

a reading means for reading the specified partial video information from the record position corresponding to a predetermined time in a recording order before the record position represented by the stored record position information; and a group detection means for detecting the picture group having a group index coincident with the group index stored in said group index memory using the partial video information read by said reading means, said reproduction resuming means resuming reproduction on the basis of the intra-frame-coded picture within the detected picture group among the partial video information read by said reading means.

18. An apparatus as in claim 17, wherein each of the pictures is provided with an identifying picture index and said apparatus further comprises:

a picture index detection means for detecting the picture index which identifies the picture displayed when the reproduction stop signal is inputted;

a picture index memory for storing said detected picture index; and a picture detection means for detecting the picture having a picture index coincident with the picture index stored in said picture index memory within the detected picture group, said reproduction resuming means resuming reproduction from the detected picture on the basis of the intra-frame-coded picture within the detected picture group and the detected picture.

19. Apparatus for stopping and resuming reproduction of video information from a record medium on which the video information and scan information are recorded, the video information comprising a plurality of picture groups, each of which has an identifying group index and a plurality of pictures, each of which pictures is compressed by intra-frame-coding or predictive-coding, the scan information representing record positions of all intra-frame-coded pictures on the record medium, said apparatus comprising:

a record position detection means for detecting the record position of a picture displayed when a reproduction stop signal is inputted and for outputting record position information representing the detected record position;

a record position memory for storing the outputted record position information;

a searching means for searching and finding the record position of the intra-frame-coded picture which is prior and closest to the record position represented by the stored record position information using the scan information when a reproduction resumption signal is inputted; and a reproduction resuming means for resuming reproduction of the video information from the record position searched for and found by said searching means.

20. Apparatus for stopping and resuming reproduction of video information from a record medium on which the video information is recorded, the video information comprising a plurality of picture groups, each of which has an identifying group index and a plurality of pictures, each of which pictures is compressed by intra-frame-coding or predictive-coding, said apparatus comprising:

a record position detection means for detecting the record position of a first picture in the picture group including the picture, which is displayed when a reproduction stop signal is inputted and for outputting record position information representing the detected record position;

a record position memory for storing the outputted record position information;

a searching means for searching and finding the record position of the intra-frame-coded picture which is prior and closest to the stored record information among the intra-frame-coded pictures in said one picture group when a reproduction resumption signal is inputted; and a reproduction resuming means for resuming reproduction of the video information from the record position searched for and found by said searching means.

21. Apparatus for stopping and resuming reproduction of video information from a record medium on which the video information and scan information are recorded, the video information comprising a plurality of picture groups, each of which has an identifying group index and a plurality of pictures, each of which pictures is compressed by intra-frame-coding or predictive-coding, the scan information representing record positions of all intra-frame-coded pictures on the record medium, said apparatus comprising:

a record position detection means for detecting the record position of the picture displayed when a reproduction stop signal is inputted;

a searching means for searching and finding the record position of the intra-frame-coded picture which is prior and closest to the detected record position among said all intra-frame-coded pictures and outputting record position information representing the searched for and found record position;

a record position memory for storing the outputted record position information; and a reproduction resuming means for resuming reproduction of the video information from the record position represented by the stored record position information when a reproduction resumption signal is inputted.

22. A method for stopping reproduction of video information from a record medium on which the video information is recorded, the video information comprising a plurality of picture groups, each of which has an identifying group index, each of the picture groups having a plurality of pictures compressed by intra-frame-coding or predictive-coding, said method comprising:

detecting the group index which identifies a picture being reproduced when a reproduction stop signal occurs;

storing said detected group index;

detecting the record position when the reproduction stop signal is inputted; and storing the detected record position information.

23. A method as in claim 22, wherein:

said detected group index includes a time code which represents elapsed time from a beginning of video information on the record medium to the picture group identified by the detected group index.

24. A method as in claim 22, wherein:

each of the pictures is provided with an identifying picture index and said method further comprises:

detecting the picture index which identifies the picture being displayed when the reproduction stop signal is inputted; and storing said detected picture index.

25. A method as in claim 24, wherein said detected picture index includes a temporal reference which represents picture display order from a first picture within said detected picture group.

26. A method for stopping reproduction of video information from a record medium on which the video information and selection reproduction information are recorded, the video information comprising a plurality of picture groups, each of which has an identifying group index and a plurality of pictures, each of which pictures is compressed by intra-frame-coding or predictive-coding, the selection reproduction information comprising a plurality of lists and a list identifier identifying each of the lists, the lists respectively prescribing reproduction orders of parts of the video information so as to select partial video information to be reproduced, said method comprising:

detecting, from the selection reproduction information, one list identifier which identifies a list corresponding to the picture displayed when a reproduction stop signal occurs; and a list identifier memory for storing said detected list identifier.

27. A method as in claim 26, wherein the selection reproduction information further comprises a plurality of partial video information numbers respectively indicating partial video information to be selectively reproduced, and said method further comprises:

detecting a partial video information number corresponding to partial video information including said picture displayed when the reproduction stop signal occurs;

storing said detected partial video information number;

detecting the group index which identifies the picture group including the picture displayed when the reproduction stop signal occurs;

storing said detected group index;

detecting the record position when the reproduction stop signal occurs; and storing the detected record position information.

28. A method as in claim 27, wherein:

each of the pictures is provided with an identifying picture index and said method further comprises:

detecting the picture index which identifies the picture displayed when the reproduction stop signal occurs; and storing said detected picture index.

29. A method for stopping and resuming reproduction of video information from a record medium on which the video information is recorded, the video information comprising a plurality of picture groups, each of which has an identifying group index and a plurality of pictures, each of which pictures is compressed by intra-frame-coding or predictive-coding, said method comprising:

detecting the group index which identifies the picture group including the picture displayed when a reproduction stop signal occurs;

storing said detected group index;

detecting the record position of said displayed picture on the record medium when the reproduction stop signal occurs;

storing the detected record position information;

reading video information from a record position corresponding to a prior recording order time from the record position represented by the record position information stored in said record position memory when a reproduction resumption signal occurs;

detecting the picture group having a group index coincident with the group index stored in said group index memory using the read video information; and resuming reproduction on the basis of the intra-frame-coded picture within the detected picture group among the read video information.

30. A method as in claim 29, further comprising:

judging whether or not the record medium, which is being read when the reproduction resumption signal is inputted, is same as that which was being read when the reproduction stop signal occurred.

31. A method as in claim 29, wherein said detected group index comprises a time code which represents elapsed time from a beginning of video information on the record medium until the reproduction occurrence of said detected picture group.

32. A method as in claim 29, wherein each of the pictures is provided with an identifying picture index and said method further comprises:

detecting the picture index which identifies the picture displayed when the reproduction stop signal occurs;

storing said detected picture index; and detecting the picture having a picture index coincident with the stored picture index within the detected picture group, and resuming reproduction from the detected picture using the intra-frame-coded picture within the detected picture group and the detected picture.

33. A method as in claim 32, further comprising:

judging whether or not the record medium, which is being read when the reproduction resumption signal occurs, is same as that was being read when the reproduction stop signal occurred.

34. A method as in claim 32, wherein said detected picture index comprises a temporal reference which represents picture display order from a first picture within said detected picture group.

35. A method for stopping and resuming reproduction of video information from a record medium on which video information and selection reproduction information are recorded, the video information comprising a plurality of picture groups, each of which has an identifying group index and a plurality of pictures, each of which pictures is compressed by intra-frame-coding or predictive-coding, the selection reproduction information comprising a plurality of lists and a list identifier identifying each of the lists, the lists respectively prescribing reproduction orders of parts of the video information so as to select partial video information to be reproduced, said method comprising:

detecting, from the selection reproduction information, one list identifier which identifies a list corresponding to the picture displayed when a reproduction stop signal occurs;

storing said detected list identifier;

detecting the list corresponding to the picture displayed when the reproduction stop signal occurred, on the basis of the stored list identifier when a reproduction resumption signal occurs; and resuming reproduction of partial video information in the reproduction order prescribed by the detected list.

36. A method as in claim 35, further comprising:

judging whether or not the record medium read when the reproduction resumption signal is inputted is same as that which was being read when the reproduction stop signal occurred.

37. A method as in claim 35, wherein the selection reproduction information further comprises a plurality of partial video information numbers respectively indicating partial video information to be selectively reproduced, and said method further comprises:

detecting the partial video information number which indicates partial video information including the picture displayed when the reproduction stop signal occurs;

storing said detected partial video information number;

detecting the group index which identifies the picture group including the picture displayed when the reproduction stop signal occurs;

storing said detected group index;

detecting the record position when the reproduction stop signal occurs;

storing the detected record position information;

specifying the partial video information displayed when the reproduction stop signal occurred using the detected list and the stored partial video information number;

reading the specified partial video information from the record position corresponding to a predetermined time in a recording order before the record position represented by the stored record position information;

detecting the picture group having a group index coincident with the group index stored in said group index memory using the partial video information read by said reading means; and resuming reproduction on the basis of the intra-frame-coded picture within the detected picture group among the partial video information read by said reading means.

38. A method as in claim 37, wherein each of the pictures is provided with an identifying picture index and said method further comprises:

detecting the picture index which identifies the picture displayed when the reproduction stop signal occurs;

storing said detected picture index;

detecting the picture having a picture index coincident with the picture index stored in said picture index memory within the detected picture group; and resuming reproduction from the detected picture on the basis of the intra-frame-coded picture within the detected picture group and the detected picture.

39. A method for stopping and resuming reproduction of video information from a record medium on which the video information and scan information are recorded, the video information comprising a plurality of picture groups, each of which has an identifying group index and a plurality of pictures, each of which pictures is compressed by intra-frame-coding or predictive-coding, the scan information representing record positions of all intra-frame-coded pictures on the record medium, said method comprising:

detecting the record position of a picture displayed when a reproduction stop signal occurs;

storing the detected record position information;

searching and finding the record position of the intra-frame-coded picture which is prior and closest to the record position represented by the stored record position information using the scan information when a reproduction resumption signal occurs; and resuming reproduction of the video information from the record position searched for and found by said searching means.

40. A method for stopping and resuming reproduction of video information from a record medium on which the video information is recorded, the video information comprising a plurality of picture groups, each of which has an identifying group index and a plurality of pictures, each of which pictures is compressed by intra-frame-coding or predictive-coding, said method comprising:

detecting the record position of a first picture in the picture group including the picture, which is displayed when a reproduction stop signal occurs;

storing the detected record position information;

searching and finding the record position of the intra-frame-coded picture which is prior and closest to the stored record information among the intra-frame-coded pictures in said one picture group when a reproduction resumption signal occurs; and resuming reproduction of the video information from the record position searched for and found by said searching means.

41. A method for stopping and resuming reproduction of video information from a record medium on which the video information and scan information are recorded, the video information comprising a plurality of picture groups, each of which has an identifying group index and a plurality of pictures, each of which pictures is compressed by intra-frame-coding or predictive-coding, the scan information representing record positions of all intra-frame-coded pictures on the record medium, said method comprising:

detecting the record position of the picture displayed when a reproduction stop signal occurs;

searching and finding the record position of the intra-frame-coded picture which is prior and closest to the detected record position among said all intra-frame-coded pictures;

storing the detected record position information; and resuming reproduction of the video information from the record position represented by the stored record position information when a reproduction resumption signal occurs.

* * * * *